(12) United States Patent
Yokota et al.

(10) Patent No.: US 8,787,582 B2
(45) Date of Patent: Jul. 22, 2014

(54) KEY IMPLEMENTATION SYSTEM

(75) Inventors: Kaoru Yokota, Hyogo (JP); Akihito Katsura, Osaka (JP); Yusuke Nemoto, Hyogo (JP); Yuishi Torisaki, Osaka (JP); Makoto Fujiwara, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/253,591

(22) Filed: Oct. 5, 2011

(65) Prior Publication Data

US 2012/0027214 A1 Feb. 2, 2012

Related U.S. Application Data

(63) Continuation of application No. PCT/JP2010/001846, filed on Mar. 15, 2010.

(30) Foreign Application Priority Data

Apr. 6, 2009 (JP) .................................. 2009-092172

(51) Int. Cl.
*H04L 9/08* (2006.01)

(52) U.S. Cl.
USPC ................. 380/286; 380/44; 380/28; 713/189

(58) Field of Classification Search
USPC ................. 380/286, 44, 28; 713/189
See application file for complete search history.

(56) References Cited

U.S. PATENT DOCUMENTS

| | | | |
|---|---|---|---|
| 5,202,921 A | 4/1993 | Herzberg et al. | |
| 5,671,284 A | 9/1997 | Buer | |
| 7,281,136 B2* | 10/2007 | Shiomi et al. | 713/189 |
| 7,882,564 B2* | 2/2011 | Asano et al. | 726/26 |
| 2003/0021421 A1 | 1/2003 | Yokota et al. | |
| 2003/0051151 A1* | 3/2003 | Asano et al. | 713/193 |
| 2003/0074571 A1* | 4/2003 | Fujiwara et al. | 713/191 |
| 2004/0151312 A1* | 8/2004 | Yanagisawa | 380/45 |
| 2004/0153657 A1 | 8/2004 | Fujiwara et al. | |
| 2005/0226410 A1 | 10/2005 | Fujiwara et al. | |
| 2006/0188099 A1* | 8/2006 | Kondo et al. | 380/277 |

(Continued)

FOREIGN PATENT DOCUMENTS

| | | |
|---|---|---|
| JP | 2000-269958 A | 9/2000 |
| JP | 2001-223687 A | 8/2001 |
| JP | 2002-185447 | 6/2002 |
| JP | 2003-101527 | 4/2003 |
| JP | 2003-134101 | 5/2003 |

(Continued)

OTHER PUBLICATIONS

Takata S., et al.: "Development of Multi-modal Encryption LSI", ITE Technical Report, Jul. 22, 1997, vol. 21, No. 42, pp. 19-24.

*Primary Examiner* — Amare F Tabor
(74) *Attorney, Agent, or Firm* — McDermott Will & Emery LLP

(57) ABSTRACT

An LSI includes a first decryptor which receives first encrypted key data, and decrypts the first encrypted key data using a first cryptographic key, thereby generating first decrypted key data, a second cryptographic key generator which generates a second cryptographic key based on a second ID, a second encryptor which encrypts the first decrypted key data using the second cryptographic key, thereby generating second encrypted key data, and a second decryptor which decrypts the second encrypted key data using the second cryptographic key, thereby generating second decrypted key data. At a time of key setting, the second encryptor stores the second encrypted key data in a storage unit. At a time of key usage, the second decryptor reads the second encrypted key data from the storage unit.

23 Claims, 18 Drawing Sheets

(56) References Cited

U.S. PATENT DOCUMENTS

| | | | |
|---|---|---|---|
| 2006/0293895 A1* | 12/2006 | Nishigaki | 704/258 |
| 2007/0003058 A1 | 1/2007 | Fujiwara et al. | |
| 2008/0294908 A1 | 11/2008 | Yamaguchi et al. | |
| 2009/0013193 A1* | 1/2009 | Matsuzaki et al. | 713/189 |
| 2009/0164801 A1* | 6/2009 | Kawahara | 713/189 |
| 2010/0189265 A1* | 7/2010 | Ito et al. | 380/285 |

FOREIGN PATENT DOCUMENTS

| | | |
|---|---|---|
| JP | 2005-294952 | 10/2005 |
| JP | 2005-303370 | 10/2005 |
| JP | 2005-303370 A | 10/2005 |
| JP | 2006-229881 | 8/2006 |
| JP | 2007-011871 | 1/2007 |
| JP | 2007-149267 | 6/2007 |
| WO | WO 2009/028137 A1 | 3/2009 |

* cited by examiner

KEY IMPLEMENTATION SYSTEM

CROSS-REFERENCE TO RELATED APPLICATION

This is a continuation of PCT International Application PCT/JP2010/001846 filed on Mar. 15, 2010, which claims priority to Japanese Patent Application No. 2009-092172 filed on Apr. 6, 2009. The disclosures of these applications including the specifications, the drawings, and the claims are hereby incorporated by reference in its entirety.

BACKGROUND

The present disclosure relates to systems for setting keys in devices and in media cards which perform authentication processing and/or cryptographic processing for copyright protection of digital audio/video (AV) content.

Digital AV content to be recorded on a secure digital (SD) card or on a digital versatile disc (DVD) medium is recorded on the medium in an encrypted form for copyright protection. A device for recording and/or reproducing such content stores a key to decrypt the encrypted content. In addition, some copyright protection techniques achieve greater security by requiring the media card storing the content to itself perform cryptographic processing and/or authentication processing. Moreover, a distribution system of copyrighted content sends the distributed content to devices also in an encrypted form, and records the content in an encrypted form even in the hard disk drives (HDDs) etc. in the devices. Such a device or a media card stores a key for encrypting/decrypting the content to be protected, and for authenticating a peer device and/or the media card. A key described above, stored in a device for copyright protection, is hereinafter referred to as "device key." A host and a media card which perform cryptographic processing and/or authentication processing are hereinafter collectively referred to as "device."

A device key is issued by a key issuing authority which is managed by a licensing entity of copyright protection technology. A device key has a different value for each device, and thus a same device key is not allowed to be set in a plurality of devices. Moreover, a device key needs to be set in a device so as not to be easily analyzed and revealed by a user. Criteria for securely setting a device key in a device are defined in secure implementation guidelines called robustness rules. Manufacturers which fabricate the devices are required to comply with these guidelines by contract.

Japanese Patent Publication No. 2002-185447 (Patent Document 1) describes a conventional technology for setting a device key in a device. This conventional technology is described in which, when manufacturing a large-scale integrated circuit (LSI), a key common to LSIs, referred to as internal key, is set in the LSI. When a device is fabricated, the device manufacturer encrypts the device key to be set in the device using this internal key, and stores the encrypted device key in an electrically erasable programmable read-only memory (EEPROM) external to the LSI. When the content is decrypted, the LSI in the device reads the encrypted device key from the EEPROM, and decrypts the encrypted device key using the internal key, thereby obtains the plaintext device key. Then, using the obtained device key, the encrypted content is decrypted. This conventional technology allows the device key to be stored in an encrypted form in the EEPROM. Accordingly, even if an unauthorized user attempts to analyze the data stored in the EEPROM, the user can obtain only the encrypted device key. Moreover, the internal key for decrypting the encrypted device key is enclosed in the LSI, and analyzing data in the LSI is much more difficult than analyzing data in the EEPROM. Therefore, it can be said that the device key is set in the device at a security level equivalent to that of when the device key is set in the LSI.

However, the present inventors have found that this conventional technology has the following problems.

(1) Risk of Unauthorized Leaks and Unauthorized Use of Device Key by Device Manufacturer The conventional technology is described in which encryption processing of a device key using an internal key is performed by the device manufacturer. That is, the key issuing authority needs to provide plaintext device keys to device manufacturers. Thus, there is a concern about unauthorized leaks and unauthorized use of a device key by an unauthorized device manufacturer.

In general, devices can be fabricated under an environment capable of purchasing parts such as LSIs and of assembling devices from such parts. Accordingly, as compared to the LSI manufacturing which requires extensive facilities, device fabrication is easier to start, and thus it is highly likely that a fraudulent device manufacturer is involved.

(2) Risk of Clone Device Production by Copying Device Key

The conventional technology is described in which the device key is encrypted using an internal key common to LSIs, and is stored in the EEPROM. Thus, simply copying the encrypted device key data stored in the EEPROM of a certain device into the EEPROM of another device allows the LSI of the another device to correctly decrypt the copied encrypted device key into the plaintext device key. That is, the device key of a certain device can be used in another device, thereby allowing a clone device to be produced. For example, robustness rules of a copyright protection technology called an advanced access content system (AACS) for blu-ray discs (BDs) require a device key implementation which prevents clone device production by copying encrypted device key data as described above; however, this conventional technology fails to meet this requirement.

(3) Extensibility of Selective Use of Internal Keys

The conventional technology discloses a configuration such that a plurality of internal keys are set in each LSI, and the internal keys are selectively used, for example, based on which device manufacturer supplies the LSI. The method of this conventional technology is applicable if the number of device manufacturers is relatively low (several to about a dozen); however, from a viewpoint of implementation cost, the maximum number of internal keys that can be set has a limit. Thus, if there exist a large number of device manufacturers, applying this method is difficult. Furthermore, it is practically impossible to selectively use one internal key for each LSI in order to solve the problem numbered 2 described above. In addition, if a need arises to supply LSIs to more device manufacturers than that foreseen at the time of development, redesign of the LSI is required because the conventional example does not allow the internal keys to be added later.

Note that, in addition to this conventional technology, other conventional technologies are described in Japanese Patent Publications Nos. 2003-134101 (Patent Document 2), 2003-101527 (Patent Document 3), and 2005-294952 (Patent Document 4). These conventional technologies also have problems as follows.

Patent Document 2 discloses a configuration which is basically similar to that of Patent Document 1, and therefore has the problems numbered 1, 2, and 3 described above.

Although the technologies disclosed in Patent Documents 3 and 4 solve the problems numbered 1 and 2, Patent Documents 3 and 4 do not disclose any configuration which solves the problem numbered 3, and in addition, have another problem, which is numbered 4, as follows.

(4) Management of Encrypted Device Key when Setting Key in Device

Patent Documents 3 and 4 disclose a configuration such that encrypted data generated based on a constant (Const) or a fuse value (IDfuse) set in the LSI is recorded in a storage unit external to the LSI. In this method, setting a different constant or fuse value in each LSI allows the above encrypted data generated by an encrypted data generator to be correctly decrypted only in the single particular LSI. However, if encrypted data may be set in an LSI having no correspondence to the encrypted data, the LSI cannot correctly decrypt the encrypted data into the device key, and thus the content cannot be correctly encrypted and/or decrypted. Thus, when fabricating devices, it would be necessary to strictly manage the correspondence between LSIs and encrypted data on a one-to-one basis, and to write the encrypted data in the external memory of an LSI which has correct correspondence to the encrypted data. Performing such data management during the device fabrication process places a burden, and results in an increase of the manufacturing cost.

SUMMARY

The present invention is advantageous to solve the above problems numbered 1, 2, 3, and 4, to prevent various information leaks and fraudulent activities, and to provide a key implementation system which achieves both extensibility and low cost.

For example, a key implementation system includes a large-scale integrated circuit (LSI) and a storage unit, where the LSI includes a first decryptor configured to receive first encrypted key data, and to decrypt the first encrypted key data using a first cryptographic key, thereby generating first decrypted key data, a second cryptographic key generator configured to generate a second cryptographic key based on a second ID, a second encryptor configured to encrypt the first decrypted key data using the second cryptographic key, thereby generating second encrypted key data, and a second decryptor configured to decrypt the second encrypted key data using the second cryptographic key, thereby generating second decrypted key data; and at a time of key setting, the second encryptor stores the second encrypted key data in the storage unit, and at a time of key usage, the second decryptor reads the second encrypted key data from the storage unit.

According to this, the key is sent to a device manufacturer in an encrypted form, thereby eliminating the risk of leaks and unauthorized use of the key by the device manufacturer. In addition, the first and the second encrypted keys can be linked to the LSI, thereby preventing a fraudulent activity of unauthorized use by copying the first or the second encrypted key data which is set in a certain LSI into another LSI.

The LSI may include a first cryptographic key generator configured to generate the first cryptographic key based on a first ID.

According to this, the internal key used for encrypting the key sent to the device manufacturer can be changed by changing the first ID, and thus selective use of internal keys can be easily achieved.

The first cryptographic key generator may generate the first cryptographic key based on a first LSI key and the first ID, and the second cryptographic key generator may generate the second cryptographic key based on a second LSI key and the second ID.

According to this, the first and the second LSI keys can be set as confidential data common to the LSIs, for example, as masks, and the first and the second IDs can be stored as unique data for each LSI, for example, as fuses. Thus, setting of LSI-specific internal keys can be easily and securely achieved.

The first ID may have a different value for every predetermined number of the LSIs, and the second ID may have a different value for each LSI.

According to this, when a device manufacturer sets a key to a device, a correspondence between the first encrypted key data and the LSI does not need to be managed on a one-to-one basis, and thus the management cost for encrypted keys is reduced in the device manufacturer. Moreover, since the second ID is LSI-specific, copying the second encrypted key data set in a certain shipped device to another device does not allow the correct key to be obtained by decryption, thereby eliminating the risk of clone device production by copying the device key.

The LSI may hold ID data including first partial data, second partial data, and third partial data, and the first ID may include the first and the third partial data, and the second ID may include the second and the third partial data.

According to this, a part of data of the first and the second IDs is shared, thereby allowing the number of bits of the IDs set in the LSI to be reduced, and the circuit size of the LSI to be reduced.

The first ID may be held in the storage unit, and the second ID may be held in the LSI.

According to this, the correspondence between the LSI and the first cryptographic key does not need to be managed in a device fabrication process, thereby allowing the management cost for cryptographic key in the device fabrication process to be significantly reduced.

The first decrypted key data may include verification data, and the LSI may include a first verifier configured to confirm the verification data, and to verify a validity of the first decrypted key data.

According to this, even if an incorrect first encrypted key may be set in the LSI in the device fabrication process, the error can be detected.

The second decrypted key data may include verification data, and the LSI may include a second verifier configured to confirm the verification data, and to verify a validity of the second decrypted key data.

According to this, even if data different from the second encrypted data set in the shipped device may be input to the LSI due to data corruption, data tampering, or read error, the error can be detected.

The key implementation system may include a content decryption processor configured to perform, using the second encrypted key data, authentication processing in relation to access to encrypted content, or decryption processing of encrypted content.

Furthermore, for example, an LSI used in a key implementation system includes a first cryptographic key generator configured to generate a first cryptographic key based on a first ID and a first LSI key, a second cryptographic key generator configured to generate a second cryptographic key based on a second ID and a second LSI key, a first decryptor configured to receive first encrypted key data, and to decrypt the first encrypted key data using the first cryptographic key, thereby generating first decrypted key data, a second encryptor configured to encrypt the first decrypted key data using the second cryptographic key, thereby generating second encrypted key data, and a second decryptor configured to decrypt the second encrypted key data using the second cryptographic key, thereby generating second decrypted key data, where at a time of key setting, the second encryptor stores the second encrypted key data in an external storage unit, and at a time of key usage, the second decryptor reads the second encrypted key data from the external storage unit.

According to this, a plaintext key can be obtained only in the LSI, and thus a device manufacturer treats the key only in an encrypted form, thereby eliminating the risk of leaks and unauthorized use of the key by a device manufacturer in the device fabrication process. In addition, copying the second encrypted key data set in a certain LSI into another LSI does not allow a correct key to be obtained by decryption, thereby eliminating the risk of clone device production by copying the key. Moreover, the first and the second encrypted keys can be linked to the LSI, thereby preventing a fraudulent activity of unauthorized use by copying the first or the second encrypted key data which is set in a certain LSI into another LSI.

DETAILED DESCRIPTION

Example embodiments of the present invention will be described below with reference to the drawings.

First Embodiment

Figure 1:
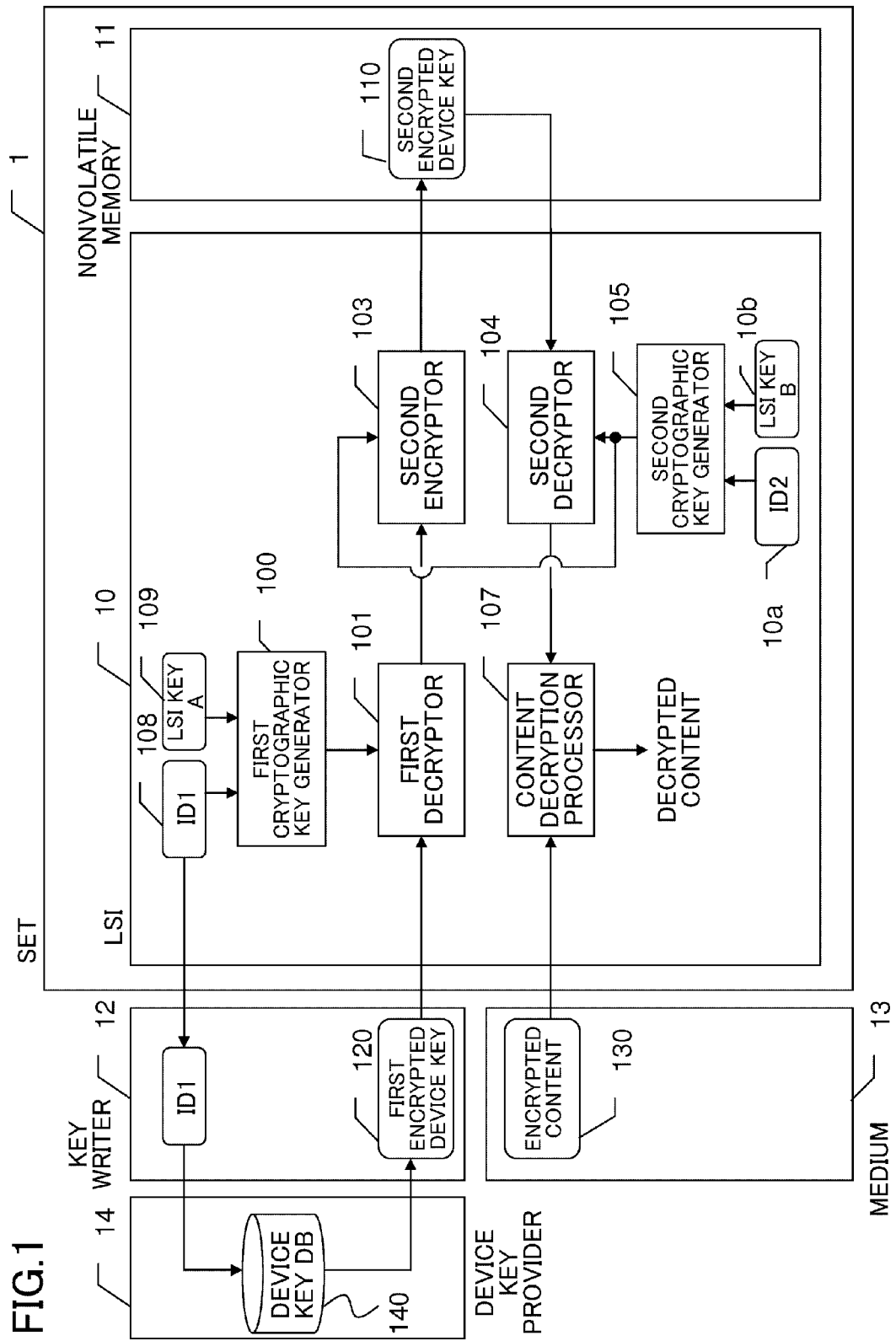
FIG. 1 is a block diagram illustrating a configuration of a key implementation system according to the first embodiment of the present invention.

FIG. 1 is a block diagram illustrating a configuration of a key implementation system according to the first embodiment of the present invention.

The key implementation system includes a set 1, a key writer 12, a medium 13, and a device key provider 14. The set 1 includes an LSI 10 and a nonvolatile memory 11.

An LSI manufacturer supplies the LSI 10 to a set manufacturer. In the LSI 10, two types of identifiers (IDs) ID1 and ID2, two types of LSI keys (LSI keys A and B), two types of cryptographic key generation processing (first and second cryptographic key generators 100 and 105), three types of cryptographic processing (a first decryptor 101, a second encryptor 103, and a second decryptor 104), and content decryption processing (content decryption processor 107) using a device key are implemented in the LSI development and manufacturing processes.

The set manufacturer supplied with the LSI 10 sets a device key to the set 1 using the key writer 12 in the following manner. The key writer 12 reads the ID1 (108) from the LSI 10, sends the read ID1 (108) to the device key provider 14, and requests for device key data. The device key provider 14 includes a database (device key DB 140) containing pairs of ID1s and first encrypted device keys. The device key provider 14 receives an ID1 input from the key writer 12, retrieves a first encrypted device key corresponding to the ID1 from the device key DB 140, and sends the retrieved first encrypted device key to the key writer 12. Data of the sent first encrypted device key is deleted from the device key DB 140, or is flagged as "sent" etc., so as to prevent the same key data from being sent again. If there are more than one first encrypted device keys which correspond to the ID1, then one of them is selected and sent. The key writer 12 inputs the obtained first encrypted device key into the LSI 10 as a first encrypted device key 120. In this regard, the device key DB 140 may be provided in the key writer 12, and the device key provider 14 may be eliminated. Receiving the input described above, the LSI 10 generates a second encrypted device key based on the first encrypted device key using the following procedure.

Step 1: The first cryptographic key generator 100 generates a first cryptographic key from the ID1 (108) and the LSI key A (109).

Step 2: The first decryptor 101 decrypts the first encrypted device key using the first cryptographic key, thereby obtains a plaintext device key.

Step 3: The second cryptographic key generator 105 generates a second cryptographic key from the ID2 (10a) and the LSI key B (10b).

Step 4: The second encryptor 103 encrypts again the plaintext device key using the second cryptographic key, thereby obtains a second encrypted device key.

The LSI 10 writes the obtained second encrypted device key into the nonvolatile memory 11 as a second encrypted device key 110. The set 1 is then shipped.

The shipped set 1 decrypts content using the set device key as follows. The following steps are performed with the medium 13, containing content, attached to the set 1.

Step A: The LSI 10 reads the second encrypted device key 110 from the nonvolatile memory 11.

Step B: The second cryptographic key generator 105 generates a second cryptographic key from the ID2 (10a) and the LSI key B (10b).

Step C: The second decryptor 104 decrypts the second encrypted device key 110 using the second cryptographic key, thereby obtains the plaintext device key.

Step D: Encrypted content 130 recorded in the medium 13 is decrypted using the plaintext device key, and thus decrypted content is obtained.

The set 1 may be shipped after the key writer 12 writes only the first encrypted device key 120 into the nonvolatile memory 11 during a set fabrication process, without performing Steps 1-3 described above which are usually performed during a set fabrication process. In this case, it is preferable that Steps 1-3 be performed only once when the set 1 is first used at the end user, thereby generating the second encrypted device key 110, and then the first encrypted device key be overwritten with the second encrypted device key 110 in the nonvolatile memory 11.

Figure 2:
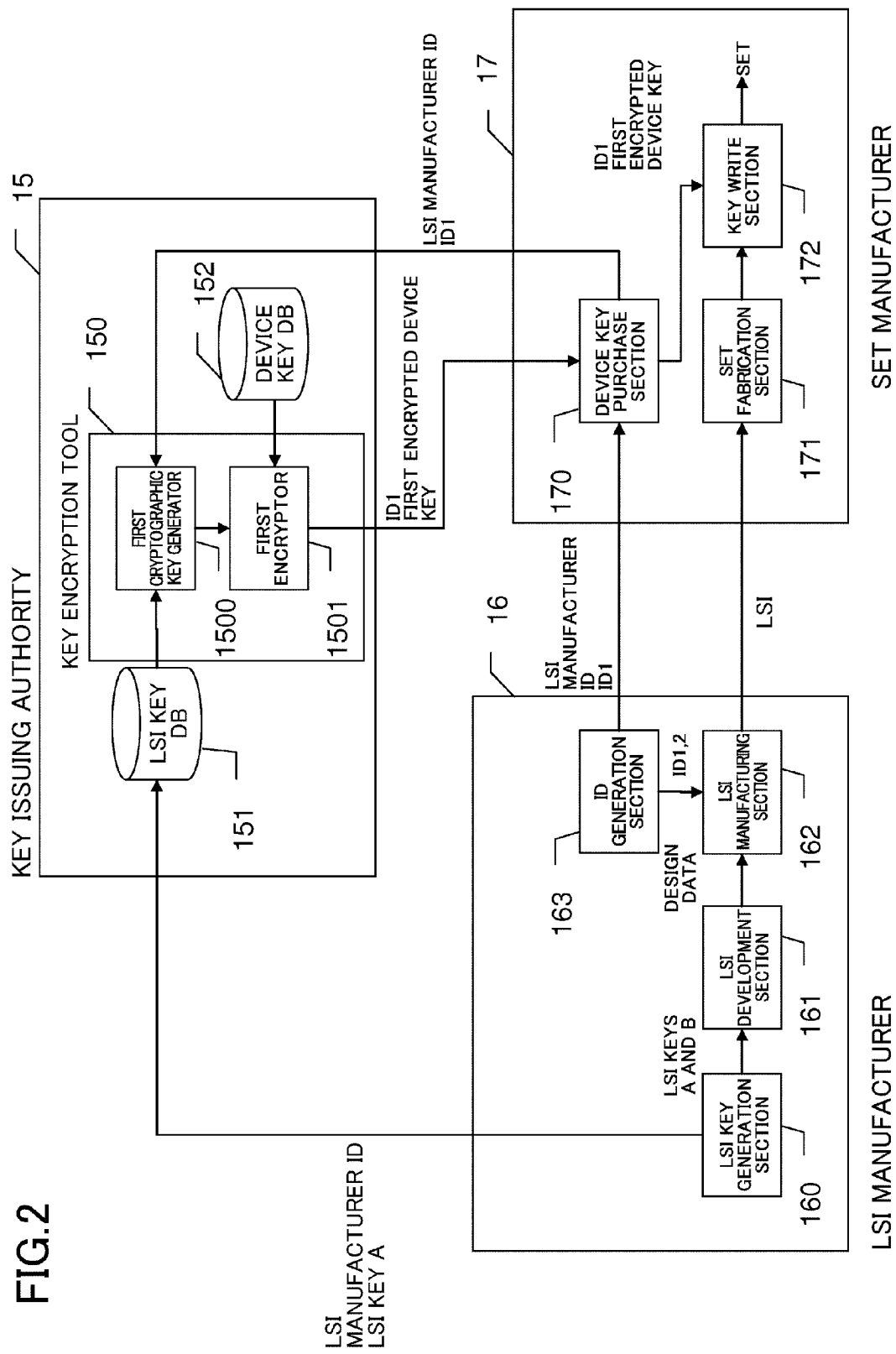
FIG. 2 is a block diagram illustrating a configuration in terms of the data flow in relation to the key implementation system according to the first embodiment of the present invention.

FIG. 2 is a block diagram illustrating the data flow in relation to the key implementation system according to the first embodiment of the present invention. The entities related to the data flow are essentially a key issuing authority 15, which generates and issues encrypted device key data, an LSI manufacturer 16, which manufactures the LSI, and a set manufacturer 17, which is supplied with the encrypted device key data issued by the key issuing authority 15, and fabricates a device using the LSI purchased from the LSI manufacturer 16.

The process flow performed at the LSI manufacturer 16 is as follows. First, an LSI key generation section 160 generates two types of LSI keys (LSI keys A and B) to be incorporated into the LSI. Next, the LSI key generation section 160 sends an LSI manufacturer ID and the LSI key A to the key issuing authority 15, and sends the LSI keys A and B to an LSI development section 161. Here, an LSI manufacturer ID is an identification number agreed upon between the key issuing authority 15 and each LSI manufacturer 16 to identify each LSI manufacturer. The LSI manufacturer ID and the LSI key A sent from the LSI manufacturer 16 to the key issuing authority 15 are registered in an LSI key DB 151 in the form of a pair (LSI manufacturer ID, LSI key A). Next, the LSI development section 161 designs and develops the LSI 10 of FIG. 1, and generates design data. The LSI keys A and B are set as ROM data. An ID generation section 163 generates two types of IDs (ID1 and ID2), and sends the IDs to an LSI manufacturing section 162. Here, the ID1 has a different value for every predetermined number of LSIs, and the ID2 has a different value for each LSI. The LSI manufacturing section 162 manufactures the LSI designed by the LSI development section 161. During this process, the ID1 and the ID2 generated by the ID generation section 163 are written into the LSI as fuses. Note that if the ID1 is changed each time a mask set is changed, the ID1 may be set as ROM data in the LSI development section 161, instead of as a fuse. The manufactured LSI is sent to the set manufacturer 17 with information on the LSI manufacturer ID and on the ID1 set in the LSI.

The process flow performed at the set manufacturer 17 is as follows. First, of what are sent from the LSI manufacturer 16, the LSI manufacturer ID and the ID1 are received at a device key purchase section 170. The device key purchase section 170 sends these pieces of information to the key issuing authority 15 along with device key order information (the number of keys to purchase etc.) at the time of device key ordering. At the key issuing authority 15, the following steps are performed in a key encryption tool 150, and thereby, a predetermined number of first encrypted device keys are generated.

Step 1: The key issuing authority 15 retrieves and obtains, from the LSI key DB 151, the corresponding LSI key A based on the LSI manufacturer ID sent from the set manufacturer 17.

Step 2: A first cryptographic key generator 1500 generates a first cryptographic key from the LSI key A and from the ID1 sent from the set manufacturer 17. Here, the algorithm for generating a cryptographic key of the first cryptographic key generator 1500 is the same as that of the first cryptographic key generator 100 of the LSI 10 of FIG. 1.

Step 3: A first encryptor 1501 obtains as many device keys as have been ordered from a device key DB 152, and encrypts the obtained device keys using the first cryptographic key, thereby generates the first encrypted device keys.

The first encrypted device keys thus generated are sent to the set manufacturer 17 along with the ID1 used for encryption, and are received at the device key purchase section 170. Then, the device key purchase section 170 sends the received first encrypted device keys to a key write section 172. The key write section 172 registers pairs of the received ID1 and the first encrypted device keys to the device key DB 140 in the device key provider 14 of FIG. 1.

The LSI sent from the LSI manufacturer 16 is sent to a set fabrication section 171. The set fabrication section 171 fabricates a set, such as the set 1 of FIG. 1, from the LSI, and sends the set to the key write section 172.

After receiving the fabricated set 1, the key write section 172 writes a first encrypted device key to the set 1 using the procedure described above. Then, the set is shipped as a completed set. The process of decrypting the encrypted content at the end user using the completed set is performed as described above.

Note that the LSI manufacturing process and the set fabrication process have only been briefly described for clarity of illustration, focusing on the features of the present invention. In reality, various test and fabrication processes which are not shown are needed.

<Advantage>

First, the following description explains that this embodiment solves the aforementioned problems.

(1) Risk of Unauthorized Leaks and Unauthorized Use of Device Key by Device Manufacturer A device key is always sent to the set manufacturer 17 in an encrypted form, and decrypted device keys are used only in the LSI 10. Accordingly, a plaintext device key is not known to the set manufacturer 17, and thus this embodiment eliminates the risk of unauthorized leaks and unauthorized use of a device key by the device manufacturer.

(2) Risk of Clone Device Production by Copying Device Key

The second encrypted device key 110, encrypted based on the ID2, is stored in the nonvolatile memory 11 of the shipped set 1. Since the ID2 has a different value for each LSI, copying the encrypted key data in the nonvolatile memory 11 into another device does not allow the another device to decrypt the copied encrypted key into a correct device key. Thus, this embodiment eliminates the risk of clone device production by copying the device key.

(3) Extensibility of Selective Use of Internal Keys

This embodiment encrypts the device key using a cryptographic key generated from an LSI key and an ID, and thus the cryptographic key functions as an internal key. A cryptographic key can be changed by changing the value of the ID. In addition, storing the IDs as fuses allows a cryptographic key to be changed without redesigning the LSI, such as a mask set change, as is required in the conventional technologies, because the values of the fuses set in the LSI can be changed. Thus, this embodiment allows higher extensibility of selective use of the internal keys than the conventional technologies.

(4) Management of Encrypted Device Key when Storing Key in Device

In this embodiment, the first encrypted device key 120 is set in the LSI 10 in the device fabrication process. The first encrypted device key 120 has been encrypted using the first cryptographic key generated from the ID1 (108) and the LSI key A (109). Here, the LSI key A has a value common to LSIs, and the ID1 has a different value for every predetermined number of LSIs. Thus, a certain first encrypted device key may be set in a plurality of LSIs having a same ID1 set therein, thereby eliminating the need for strict management to associate the encrypted device keys with the LSIs on a one-to-one basis as in the conventional technologies, and thus allowing data management to be easier in the device fabrication process. For example, if the ID1 is managed so as to have a different value for each lot of devices, there is no need for the set manufacturer to manage the relationship between the encrypted device keys and the LSIs for a same lot. Moreover, if the ID1 is managed so as to have a different value for each set manufacturer which is supplied with the LSIs, there is no need to manage the relationship regardless of the lot number. Thus, the problem of management of encrypted device keys required at the time of key setting as seen in the conventional technologies can be reduced or eliminated.

Furthermore, this embodiment can provide another advantage as described below.

Changing the value of the ID1 (108) every predetermined number of LSIs provides an advantage as described below. Assume that the set manufacturer which has received a first encrypted device key 120 fraudulently sets the same first encrypted device key 120 to a plurality of sets. Such unauthorized setting of the device key is only possible on the predetermined number of LSIs in which ID1s having a same value are set, and setting the same device key to other LSIs never allows the decryption processing to be correctly performed in the first decryptor 101, and thus no correct second encrypted device keys are written into the nonvolatile memory 11. Thus, such a fraudulent activity can be successful at most in the predetermined number of LSIs, thereby allowing the LSIs affected by the fraudulent activity to be limited to a certain range.

In addition, even if the LSI key A sent to the key issuing authority 15 may be leaked during a transmission process between the LSI manufacturer 16 and the key issuing authority 15, or from the LSI key DB 151 in the key issuing authority 15, and become known to a third party, the plaintext device key cannot be analyzed from the data within the shipped set. This is because the device key set in the shipped device is encrypted using the cryptographic key which is generated from the LSI key B.

Furthermore, the selective use of the two types of IDs (i.e., ID1 and ID2) allows the ID2 to be more secure, because the ID2 used for encryption when incorporating the device key into the product is disclosed only to the LSI manufacturer.

Second Embodiment

Figure 3:
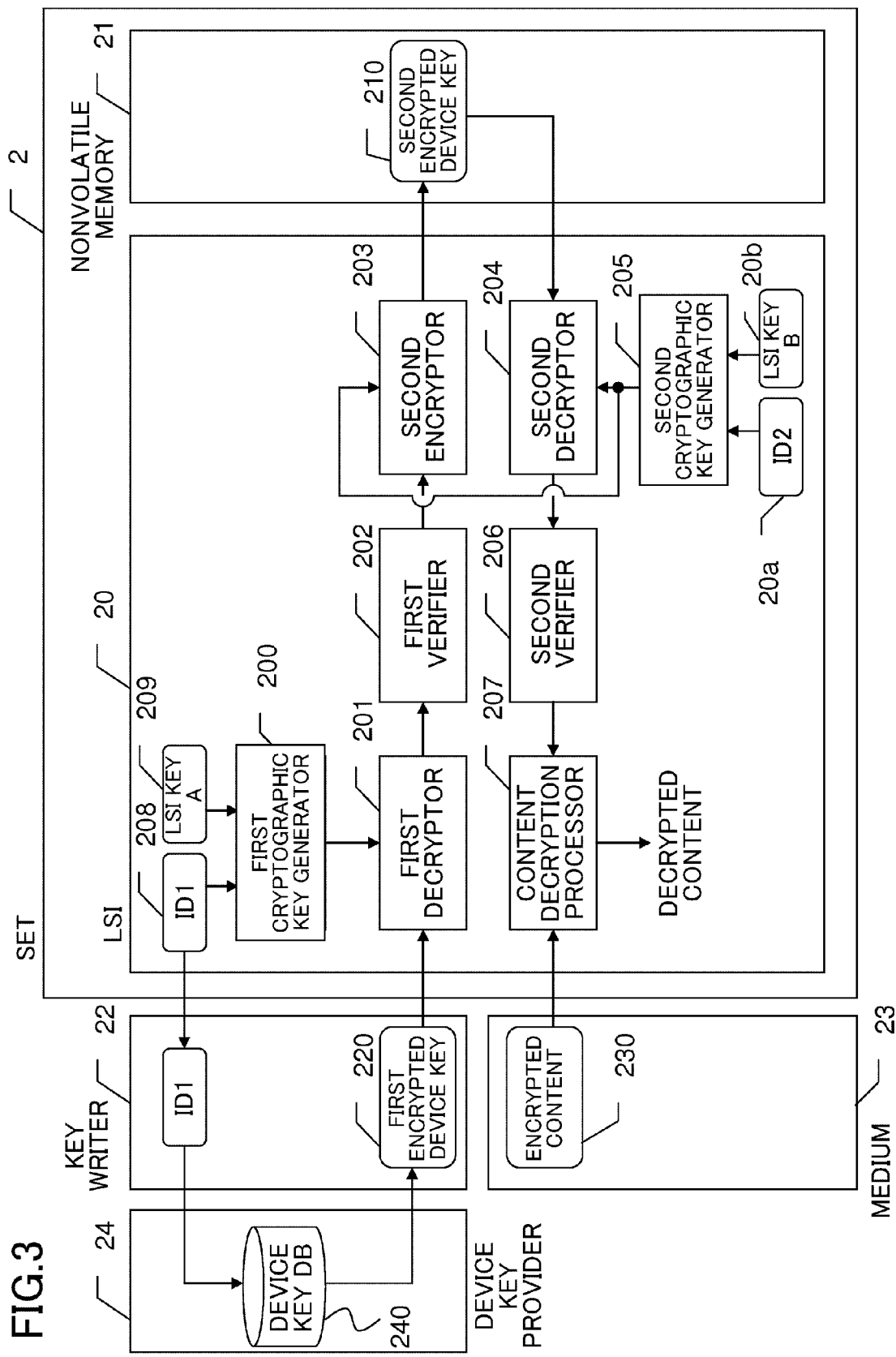
FIG. 3 is a block diagram illustrating a configuration of a key implementation system according to the second embodiment of the present invention.

FIG. 3 is a block diagram illustrating a configuration of a key implementation system according to the second embodiment of the present invention. In FIG. 3, the components and the functions thereof included in a key writer 22, a set 2, a medium 23, and a device key provider 24 are basically the same as those of the key writer 12, the set 1, the medium 13, and the device key provider 14 of the first embodiment shown in FIG. 1. Here, only the differences from the first embodiment will be described.

The process of setting the device key to the set 2 at the set manufacturer differs from that of the first embodiment as follows.

Addition of Verification Process of Decrypted Device Key by First Verifier 202

In the process of setting the encrypted device key to the set, a first verifier 202 confirms whether or not the value of a predetermined field (e.g., four most significant bytes) of the decrypted data which has been decrypted by a first decryptor 201 matches a predefined verification data (e.g., a hexadecimal value of FFFFFFFF). If a match occurs, the decrypted data is input to the second encryptor 203. If no match occurs, the subsequent process of setting the encrypted device key is no more performed, and an error is output.

The process of decrypting the encrypted content 230 in the medium 23 performed by the shipped set 2 differs from that of the first embodiment as follows.

Addition of Verification Process of Decrypted Device Key by Second Verifier 206

In the process of decrypting the encrypted device key at the time of decryption of encrypted content, a second verifier 206 confirms whether or not the value of a predetermined field (the same location as the field used for verification by the first verifier 202) of the decrypted data which has been decrypted by a second decryptor 204 matches a predefined verification data (same as the verification data used for verification by the first verifier 202). If a match occurs, data obtained by removing the part of the verification data from the decrypted data is input to a content decryption processor 207 as the device key.

Figure 4:
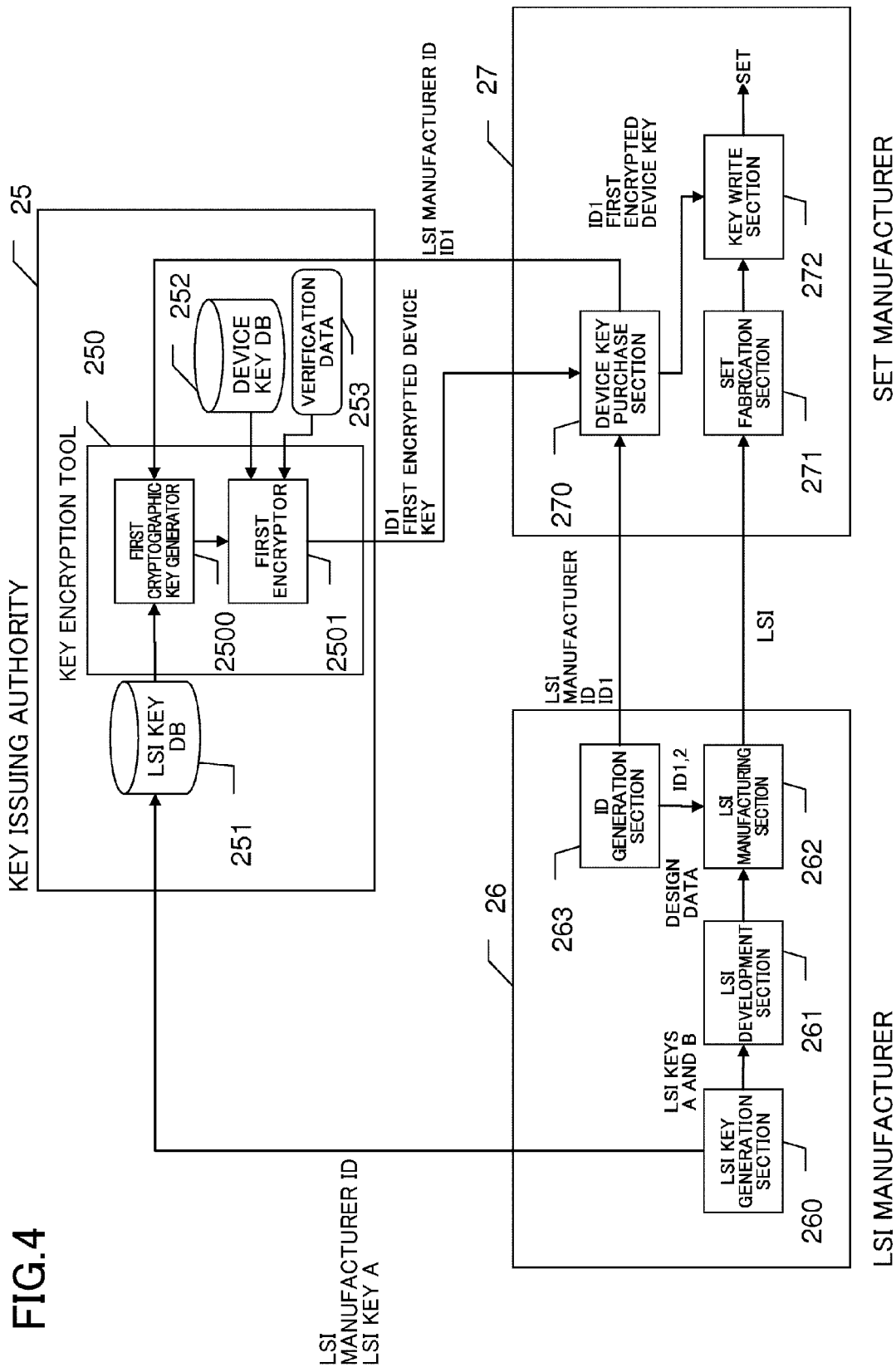
FIG. 4 is a block diagram illustrating a configuration in terms of the data flow in relation to the key implementation system according to the second embodiment of the present invention.

FIG. 4 is a block diagram illustrating the data flow in relation to the key implementation system according to the second embodiment of the present invention. In FIG. 4, the components and the functions thereof included in a key issuing authority 25, an LSI manufacturer 26, and a set manufacturer 27 are basically the same as those of the key issuing authority 15, the LSI manufacturer 16, and the set manufacturer 17 of the first embodiment shown in FIG. 2. Here, only the difference from the first embodiment will be described.

This embodiment differs from the first embodiment only in the following respect.

Processing of First Encryptor 2501 for Generating First Encrypted Device Key A first encryptor 2501 generates data in which verification data 253 is coupled to the device key read from the device key DB 252. For example, a hexadecimal value of FFFFFFFF (four bites) is used as the verification data 253, and is coupled to the most significant side of the device key data. The obtained data is encrypted using the first cryptographic key generated by a first cryptographic key generator 2500, thereby generating the first encrypted device key.

Note that, as long as determined previously, the verification data may have any size and any specific data. In addition, the verification data is not limited to having a fixed pattern, but may be calculated from the device key data based on a predetermined calculation formula, such as a cyclic redundancy check (CRC) code.

<Advantage>

This embodiment generates an encrypted device key from data in which verification data is added to the device key, and thus it is possible to confirm whether or not a correct device key has been decrypted in the decryption processing of the device key. Thus, even if a wrong first encrypted device key may be attempted to be set to the LSI at the time of set fabrication, the first verifier 202 outputs an error, thereby preventing wrong key data from being set. In addition, it is also possible to confirm whether or not a correct device key has been decrypted when the fabricated set decrypts encrypted content using the set device key. Thus, even if a wrong second encrypted device key is input to the LSI due to data corruption, data tampering, or read error, the second verifier 206 detects an error, thereby preventing a wrong key from being used. Needless to say, this embodiment also provides the advantages described above with respect to the first embodiment.

Third Embodiment

Figure 5:
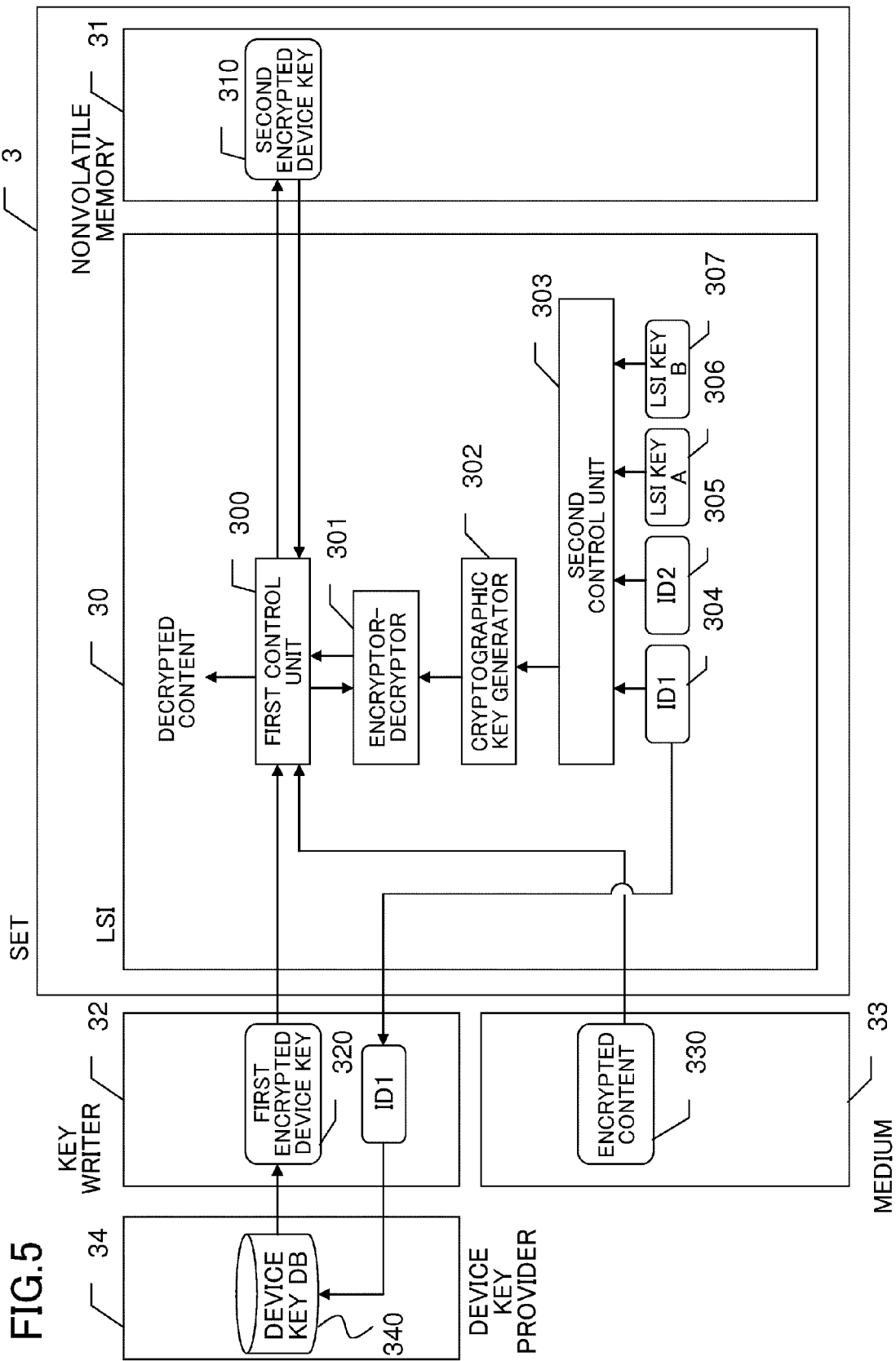
FIG. 5 is a block diagram illustrating a configuration of a key implementation system according to the third embodiment of the present invention.

FIG. 5 is a block diagram illustrating a configuration of a key implementation system according to the third embodiment of the present invention. The configuration of an LSI 30 is different from that of the key implementation system according to the first embodiment shown in FIG. 1, and thus only the differences will be described below.

The third embodiment shares a circuit, assuming that a same algorithm is used as the decryption algorithms in the first and the second decryptors 101 and 104 in the first embodiment. This processing is performed in an encryptor-decryptor 301. Moreover, in general, it is known that sharing core processes of encryption processing and decryption processing allows the circuit size to be reduced as compared to implementing such core processes in completely separate circuits. In consideration of this, the encryptor-decryptor 301 also includes the processing circuit of the second decryptor 104.

This embodiment shares a circuit, assuming that a same algorithm is used as the cryptographic key generation algorithms of the first and the second cryptographic key generators 100 and 105 of the first embodiment. This processing is performed in a cryptographic key generator 302.

A first control unit 300 controls input/output data to/from the encryptor-decryptor 301. A second control unit 303 control input data to the cryptographic key generator 302.

The key implementation system of this embodiment only differs in the configuration in the LSI 30 as described above, and operates similarly to that of the first embodiment. This embodiment provides the same advantages as those of the first embodiment; besides, the circuit size of the LSI can be reduced.

Fourth Embodiment

Figure 6:
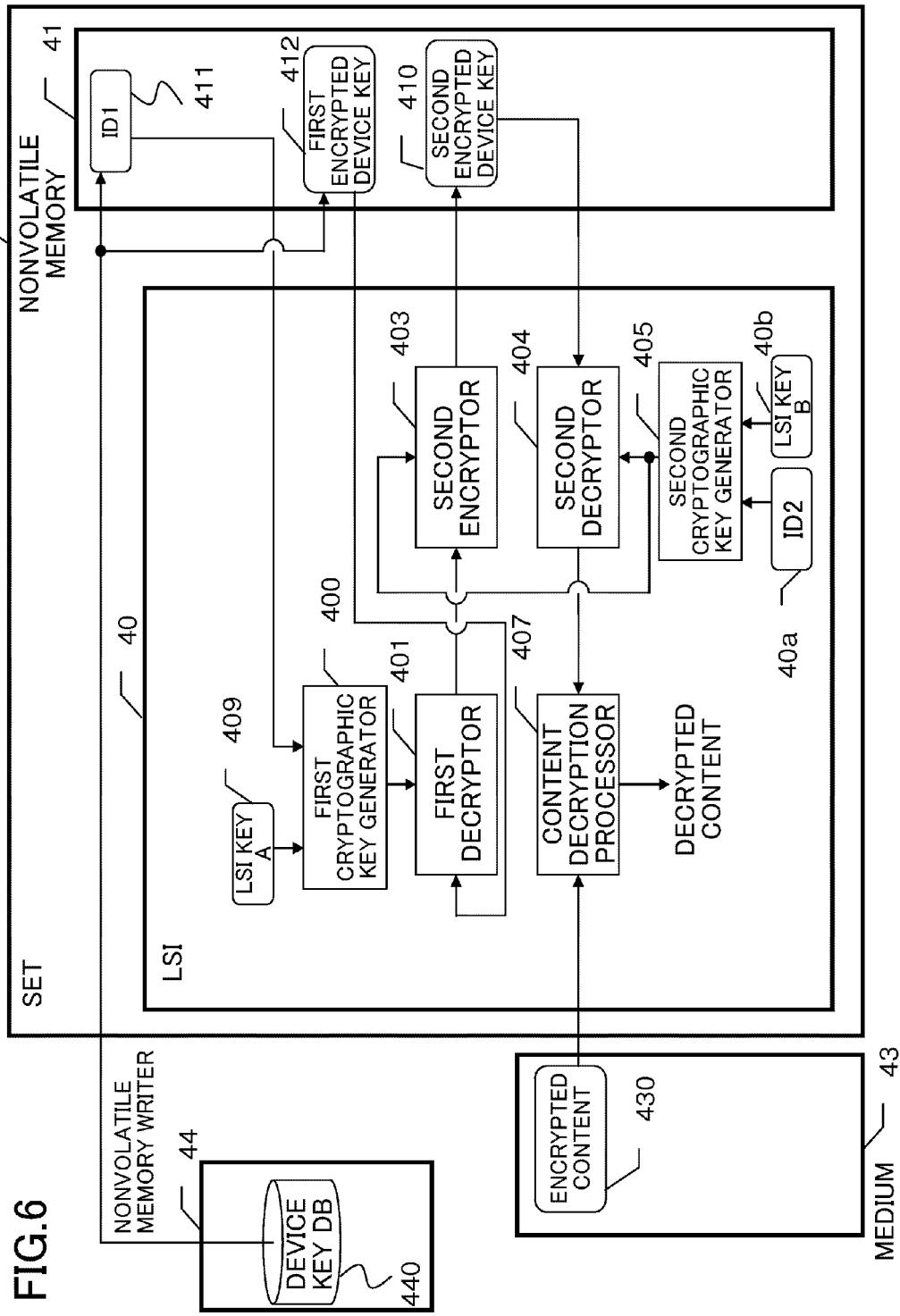
FIG. 6 is a block diagram illustrating a configuration of a key implementation system according to the fourth embodiment of the present invention.

FIG. 6 is a block diagram illustrating a configuration of a key implementation system according to the fourth embodiment of the present invention. The basic configuration and operation are the same as those of the key implementation system according to the first embodiment shown in FIG. 1, and thus only the differences from the first embodiment will be described below.

In the first embodiment, the ID1 is set inside the LSI in the LSI manufacturing process. On the other hand, in this embodiment, the ID1 is written into a nonvolatile memory 41 external to the LSI when the key is written into the set at the set manufacturer. The process of writing the key into the set is as follows. First, a nonvolatile memory writer 44 reads a pair of the ID1 and the first encrypted device key from a device key DB 440 included therein (unlike the first embodiment, the nonvolatile memory writer 44 does not read and send the ID1 from the LSI to the device key provider upon such a request). The pair of the read ID1 and the read first encrypted device key are deleted from the device key DB 440, or are flagged as "sent" etc., so as to prevent the same key from being used twice. Then, the nonvolatile memory writer 44 writes the read ID1 and the read first encrypted device key directly into the nonvolatile memory 41 as an ID1 (411) and a first encrypted device key (412). After this, the LSI 40 reads the first encrypted device key 412 from the nonvolatile memory 41, performs the re-encryption steps 1-4 of the first embodiment, thereby generating the second encrypted device key, and writes the second encrypted device key into the nonvolatile memory 41 as a second encrypted device key 410. Note that the ID1 which is used is not the one set inside the LSI 40, but the ID1 (411) written into the nonvolatile memory 41. The second encrypted device key 410 is written so as to overwrite the first encrypted device key 412.

The shipped set 4 decrypts encrypted content 430 recorded in the medium 43 in the same way as that of the first embodiment, except that the ID1 which is used is not the one set inside the LSI 40, but the ID1 (411) written into the nonvolatile memory 41.

The data flow related to the key implementation system according to the fourth embodiment of the present invention is the same as that of the first embodiment shown in FIG. 2, and thus the explanation thereof will be omitted.

The first embodiment requires the first encrypted device key to be consistent with the ID1 set in the LSI when the first encrypted device key is written into the set. Meanwhile, this embodiment eliminates such a need, thereby eliminates the need for the set manufacturer to perform matching management between the keys and the ID1s, and thus provides an advantage in that the management cost is reduced.

Moreover, the re-encryption process performed by the LSI 40 (Steps 1-4 of the first embodiment) after the nonvolatile memory writer 44 writes the first encrypted device key 412 into the nonvolatile memory 41 is not needed to be performed during the key write process, but can be performed when the LSI 40 is started in the post-process such as the inspection process of sets, or when the end user starts the set 4 for the first time after the shipment. Thus, the LSI is not started in the key write process, thereby allowing the time required for the key write process to be reduced.

Fifth Embodiment

Figure 7:
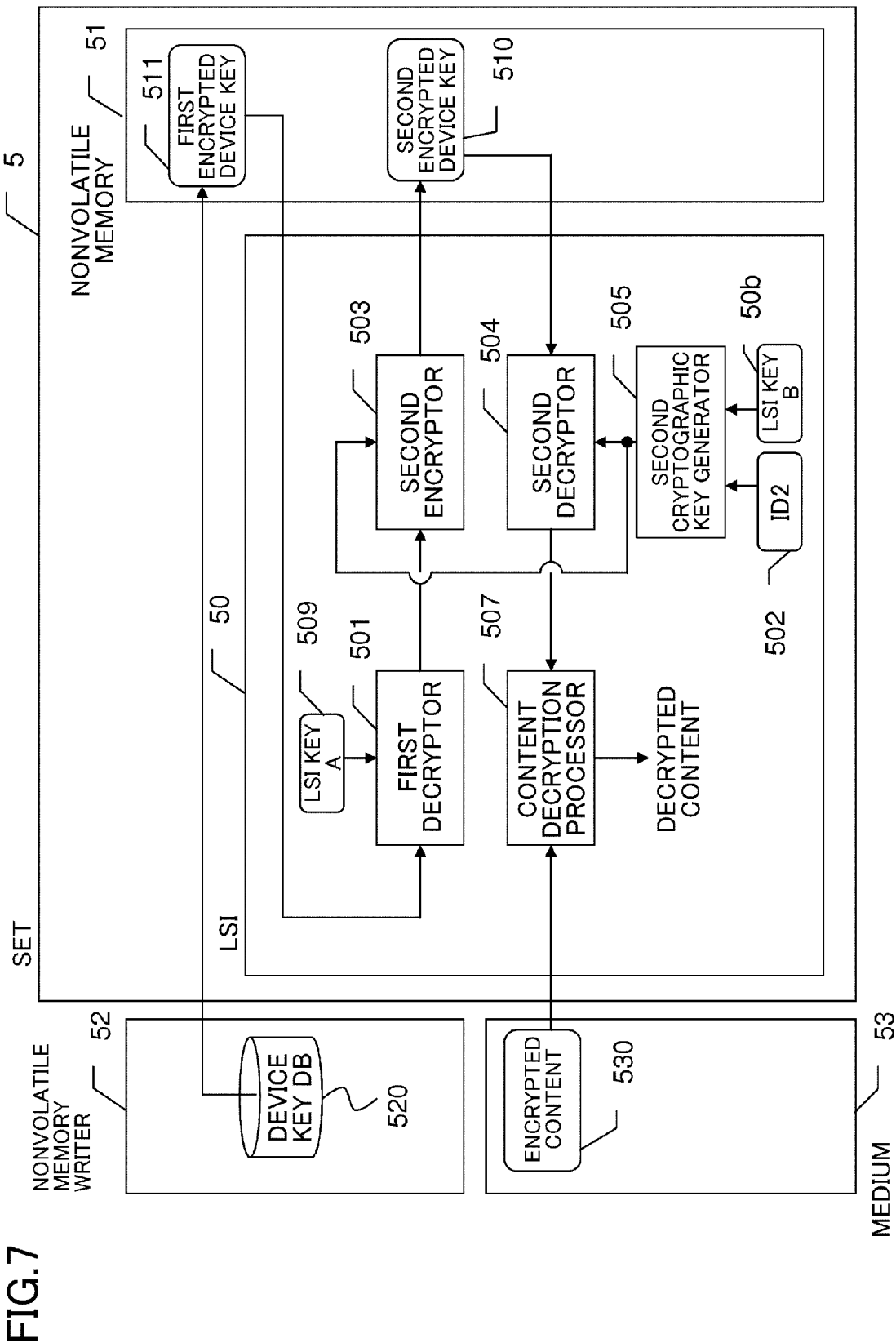
FIG. 7 is a block diagram illustrating a configuration of a key implementation system according to the fifth embodiment of the present invention.

FIG. 7 is a block diagram illustrating a configuration of a key implementation system according to the fifth embodiment of the present invention. The basic configuration and operation are the same as those of the key implementation system according to the fourth embodiment shown in FIG. 6, and thus only the differences from the fourth embodiment will be described below.

In the fourth embodiment, the first cryptographic key generator 400 generates the first cryptographic key from the LSI key A and the ID1. On the other hand, in this embodiment, the LSI 50 does not include a first cryptographic key generator; instead, the first decryptor 501 decrypts the first encrypted device key 511 directly using the LSI key A as the cryptographic key. In addition, the ID of this embodiment is ID data corresponding to the ID2 of the fourth embodiment. The other processes are the same as those of the fourth embodiment.

Figure 8:
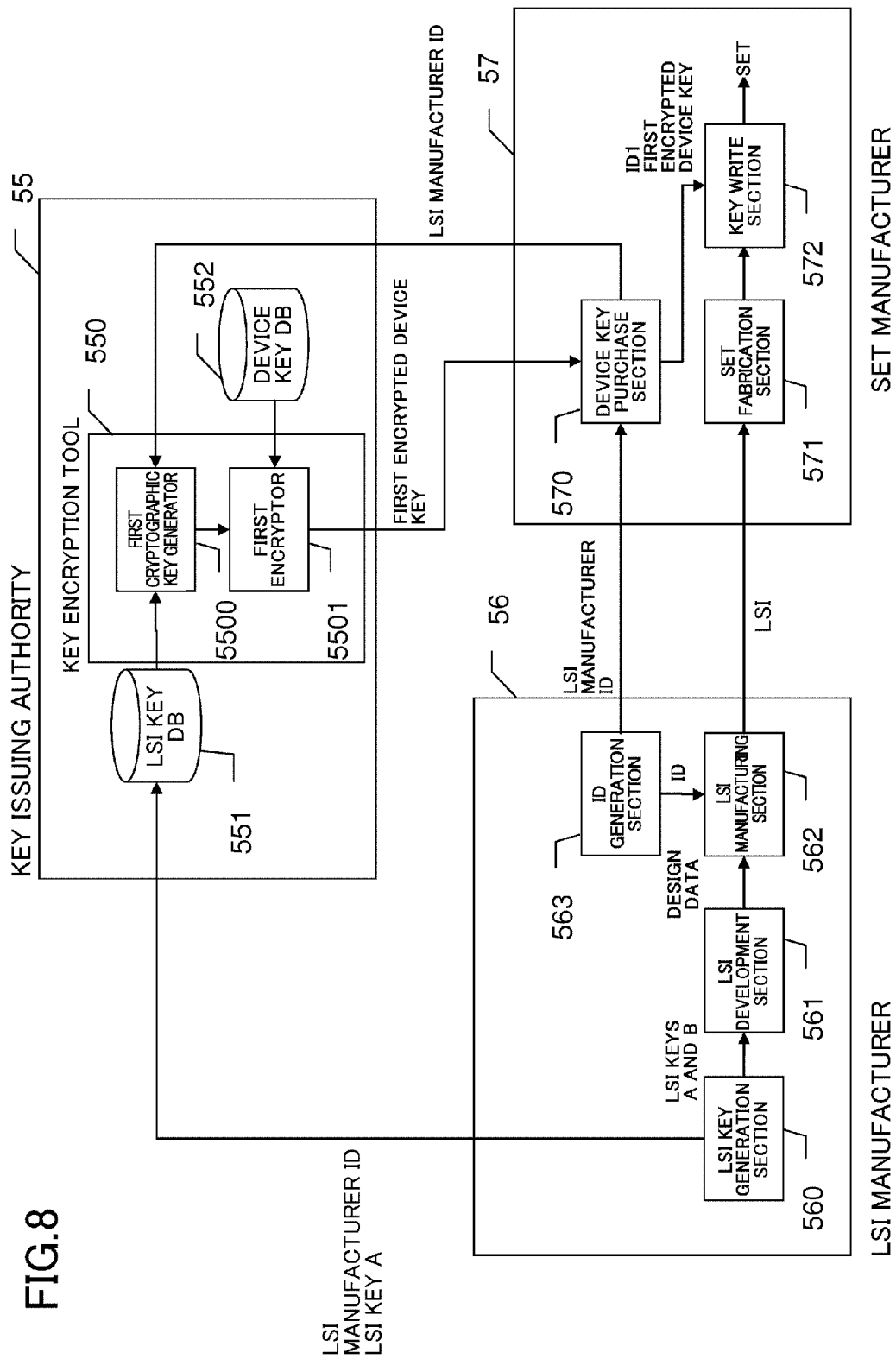
FIG. 8 is a block diagram illustrating a configuration in terms of the data flow in relation to the key implementation system according to the fifth embodiment of the present invention.

FIG. 8 is a block diagram illustrating the data flow in relation to the key implementation system according to the fifth embodiment of the present invention. The basic configuration and operation are the same as those of the first embodiment shown in FIG. 2, and thus only the differences from the first embodiment will be described below.

The first cryptographic key generator 1500 is deleted from FIG. 2 of the first embodiment. In addition, data ID1 is all removed from the data exchanged between blocks, and data ID2 is rewritten to ID. FIG. 8 of this embodiment is thus yielded. Accordingly, this embodiment differs from the first embodiment in the following processes. First, the LSI key DB 551 receives an input of the LSI manufacturer ID, retrieves the LSI key A corresponding thereto, and inputs the retrieved LSI key A into the first encryptor 5501. The first encryptor 5501 encrypts the device key obtained from the device key DB 552 using the LSI key A, thereby generates the first encrypted device key. The other processes are the same as those of the first embodiment.

Similarly to the fourth embodiment, this embodiment also eliminates the need for the set manufacturer to perform matching management between the keys and the ID1s, and thus provides an advantage in that the management cost is reduced. Moreover, similarly to the fourth embodiment, the re-encryption process performed by the LSI 50 (Steps 1-4 of the first embodiment) after the nonvolatile memory writer 52 writes the first encrypted device key 511 into the nonvolatile memory 51 can be performed during any process after the key write process, or when the end user starts the set 5, thereby allowing the time required for the key write process to be reduced. Furthermore, similarly to the fourth embodiment, eliminating the need to record the ID1 also provides an advantage in that the storage capacity of the external memory can be reduced accordingly.

Sixth Embodiment

Figure 9:
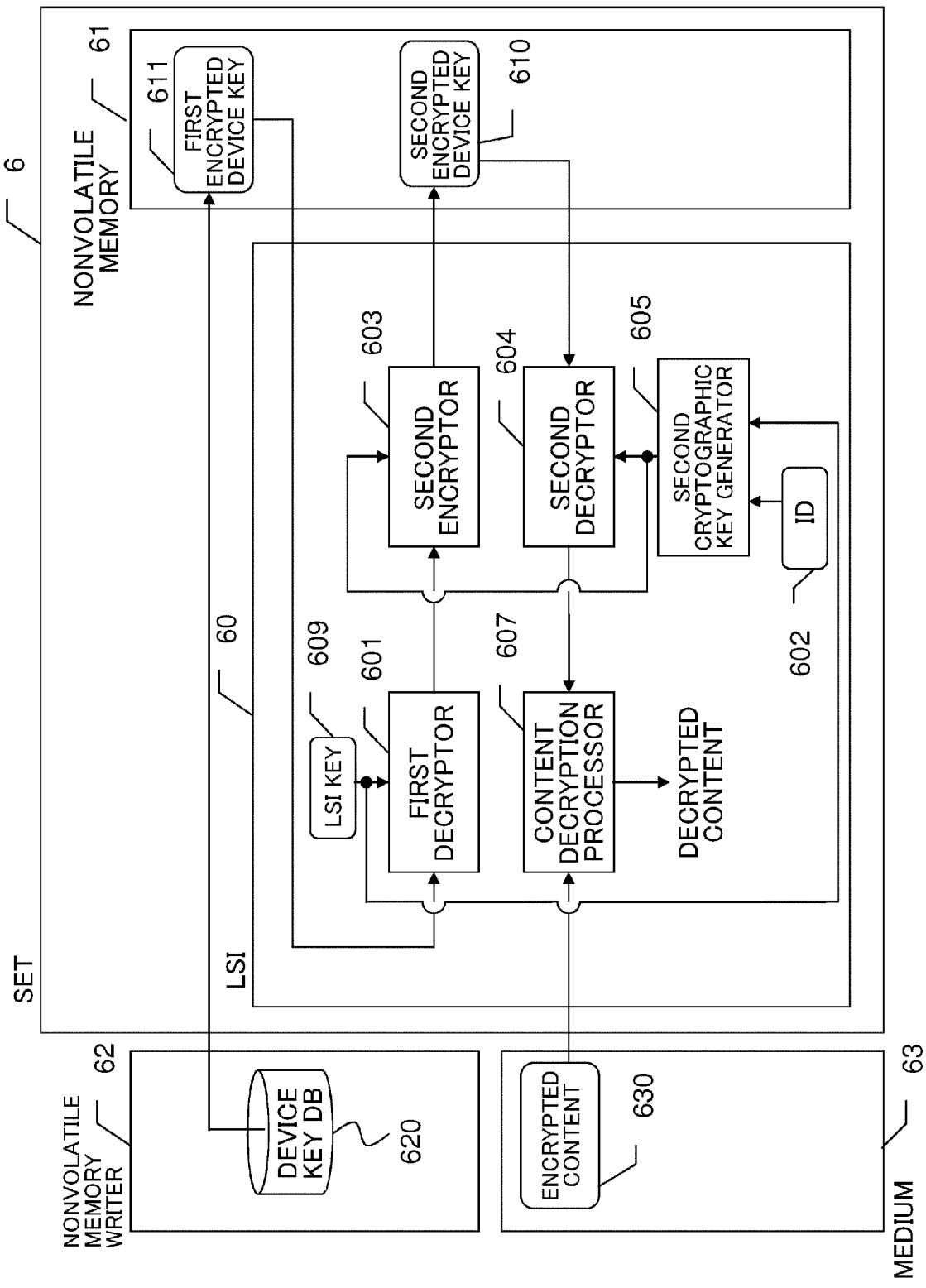
FIG. 9 is a block diagram illustrating a configuration of a key implementation system according to the sixth embodiment of the present invention.

FIG. 9 is a block diagram illustrating a configuration of a key implementation system according to the sixth embodiment of the present invention. This embodiment differs from the fifth embodiment in that the same key data is used for the LSI keys A and B, and the common key is referred to as LSI key. The process flow of this embodiment is obtained by replacing the LSI keys A and B with the LSI key in the processes using at least either the LSI key A or B of the fifth embodiment.

This embodiment requires only one LSI key to be stored, and thus provides an advantage in that the circuit area can be reduced accordingly, in addition to the advantages provided by the fifth embodiment.

Seventh Embodiment

Figure 10:
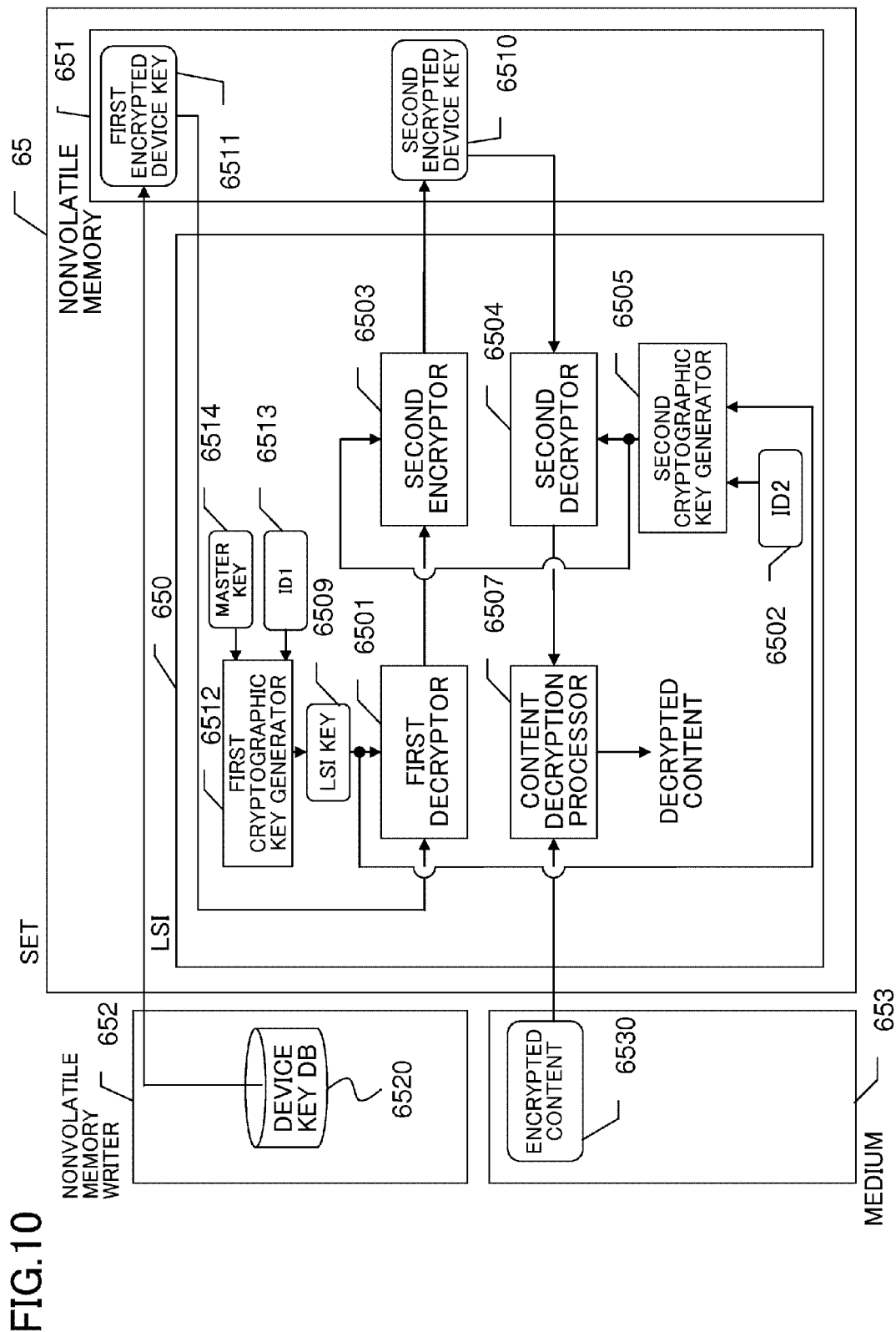
FIG. 10 is a block diagram illustrating a configuration of a key implementation system according to the seventh embodiment of the present invention.

FIG. 10 is a block diagram illustrating a configuration of a key implementation system according to the seventh embodiment of the present invention. This embodiment differs from the sixth embodiment in that a first cryptographic key generator 6512, an ID1 (6513), and a master key 6514 are newly added. The first cryptographic key generator 6512 performs generation processing of a cryptographic key based on the master key 6514 and the ID1 (6513), thereby generates an LSI key 6509. Processes using the generated LSI key 6509 etc. are the same as those of the sixth embodiment, and thus the explanation thereof will be omitted.

In this embodiment, for example, setting the master key 6514 as ROM data, and the ID1 (6513) as a fuse allows the LSI key 6509 to be changed by changing the ID1 (6513), which is a fuse value. Thus, the LSI key can be changed without changing a mask set. In addition, similarly to the sixth embodiment, this embodiment requires only one master key to be set as the key data, and thus also provides an advantage in that the circuit area can be reduced accordingly.

Eighth Embodiment

Figure 12:
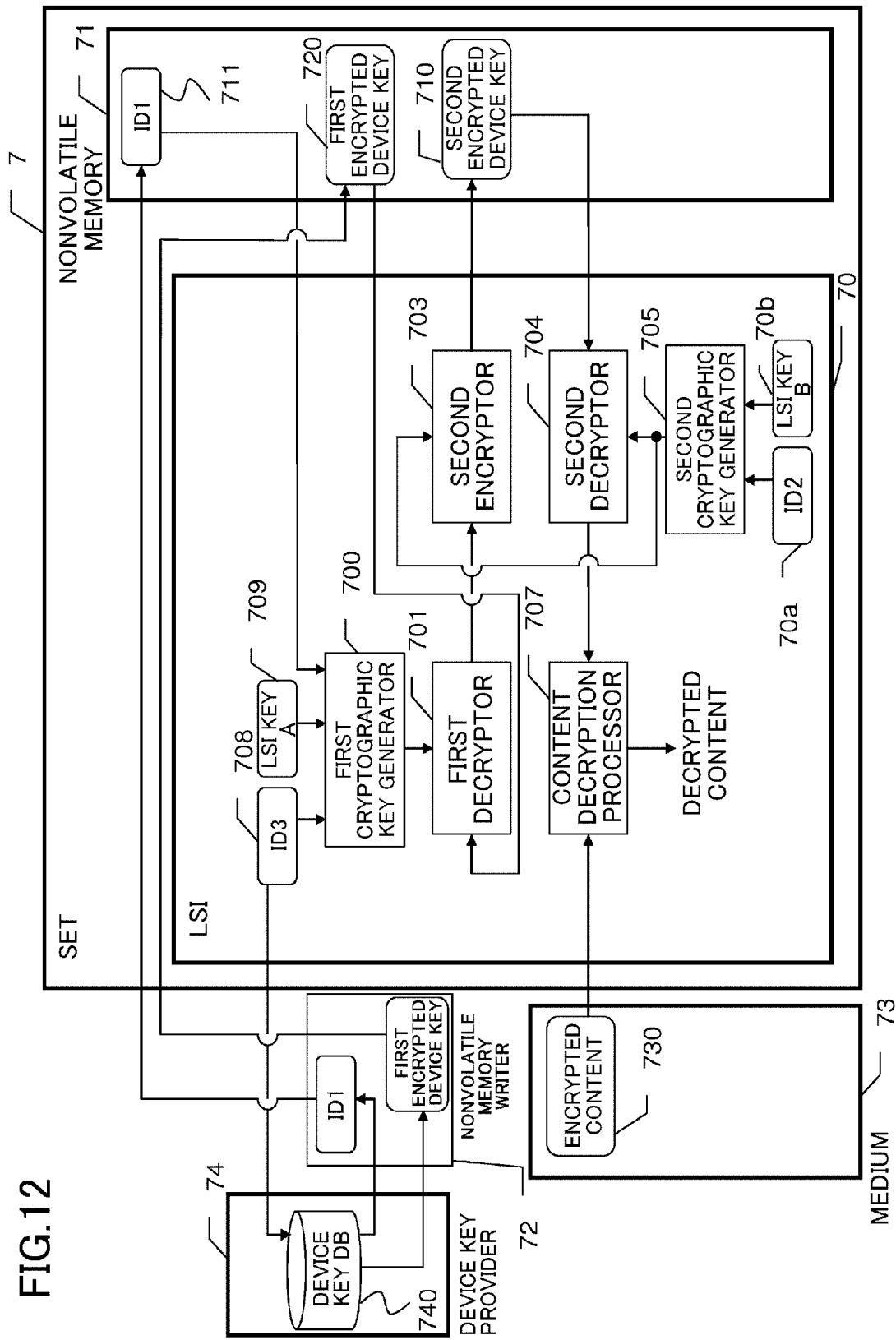
FIG. 12 is a block diagram illustrating a configuration of a key implementation system according to the eighth embodiment of the present invention.

FIG. 12 is a block diagram illustrating a configuration of a key implementation system according to the eighth embodiment of the present invention.

The basic configuration and operation are the same as those of the fourth embodiment shown in FIG. 6, and thus only the differences from the fourth embodiment will be described below.

As compared to the fourth embodiment, an ID3 is further introduced in addition to the ID1 and the ID2. The ID3 has a different value for every predetermined number of LSIs, and is set in the LSI at the time of LSI manufacturing. The first cryptographic key generator is changed so as to generate the first cryptographic key based on the LSI key A, the ID1, and the ID3. In FIG. 12, the process of setting the device key to the set 7, including the LSI 70 and the nonvolatile memory 71, is as follows. One or more sets of data—each set including the ID3, the ID1, and the first encrypted device key—are registered in the form of a list in the device key DB 740 in the device key provider 74. First, the device key provider 74 reads the ID3 (708) from the LSI 70, and searches the device key DB 740 based on the value of the ID 3 (708). Then, the device key provider 74 extracts the corresponding set of the ID3, the ID1, and the first encrypted device key, and sends only the ID1 and first encrypted device key to the nonvolatile memory writer 72. The extracted set of data is deleted from the database, or is flagged as "used" etc., so as to prevent the same set from being used twice. If more than one sets are retrieved, one of the sets is arbitrarily selected. After receiving the ID1 and the first encrypted device key sent, the nonvolatile memory writer 72 writes the ID1 and the first encrypted device key into the nonvolatile memory 71 as an ID1 (711) and a first encrypted device key 710. The subsequent processes are the same as those of the fourth embodiment, except that the first cryptographic key generator 700 generates the first cryptographic key based also on the ID3 (708) in addition to the LSI key A (709) and the ID1 (711).

Although the fourth embodiment provides some additional advantages, writing the ID1 into the nonvolatile memory allows fraudulent activity such that a same pair of an ID1 and a first encrypted device key is set to more than one sets. On the contrary, the eighth embodiment links the first encrypted device key with the ID3 set in the LSI, and thus provides an advantage in that the above fraudulent activity is not possible, or possible only in a limited range (possible only in LSIs having the same ID3 set therein).

(Variations)

It is understood that the present invention is not limited to the particular embodiments described above, but the variations described below are also within the scope of the present invention.

(1) The cryptographic scheme for encrypting and decrypting the device key is not limited to a particular algorithm. Any algorithm, such as an Advanced Encryption Standard (AES) or Data Encryption Standard (DES) cipher algorithm, can be used. In addition, the data size and the number of data elements of each set of data are not limited to any particular size and number.

Figure 16:
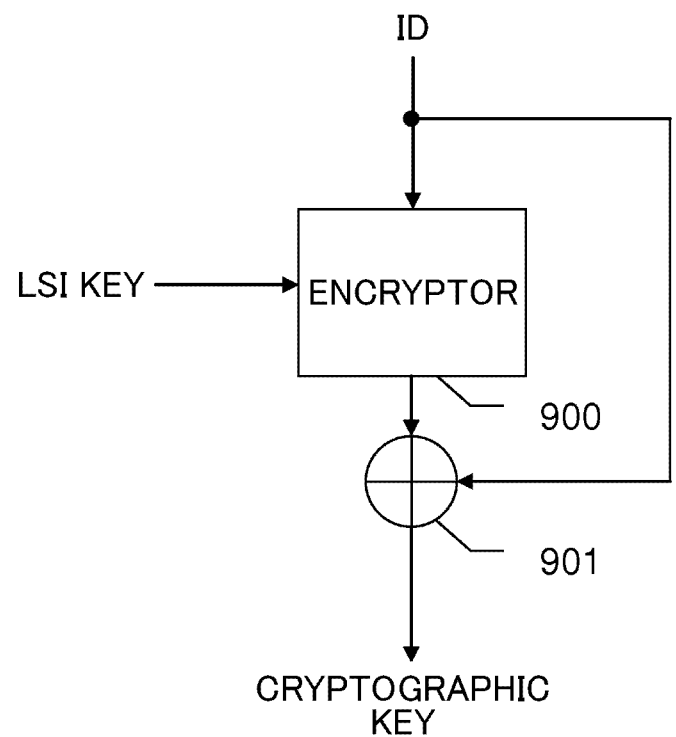
FIG. 16 is a block diagram illustrating a configuration of a cryptographic key generator.

(2) The algorithm for generating a cryptographic key is not limited to a particular algorithm. For example, a hash algorithm such as Secure Hash Algorithm 1 (SHA-1) or Message Digest 5 (MD5) may be used, or a hash algorithm using a block cipher algorithm such as an AES or DES cipher algorithm may be used. Alternatively, a message authentication code (MAC) calculation algorithm using cipher-based message authentication code (CMAC) or block cipher may be used. FIG. 16 illustrates an example of an algorithm used for key generation. The LSI key in the figure represents either the LSI key A or the LSI key B, and the ID represents either the ID1 or the ID2. The encryptor 900 uses an arbitrary cryptographic algorithm such as an AES or DES cipher algorithm. Here, the cryptographic key is generated as follows.

Step 1: The encryptor 900 encrypts the ID using the LSI key.

Step 2: The exclusive OR (XOR) unit 901 performs an XOR operation between the result of the encryption of Step 1 and the ID bit by bit, and the result is output as the cryptographic key. Note that the cryptographic processing used in the encryptor 900 is not limited to encryption processing, but a decryption algorithm of an AES or DES cipher algorithm etc. may also be used.

Figure 17:
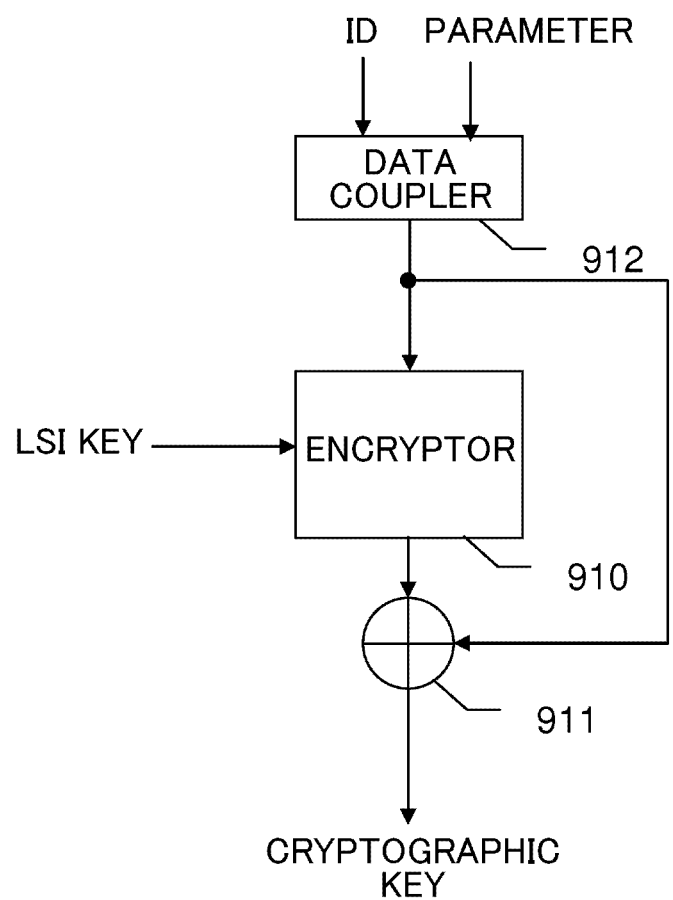
FIG. 17 is a block diagram illustrating a configuration of another cryptographic key generator.
Figure 18:
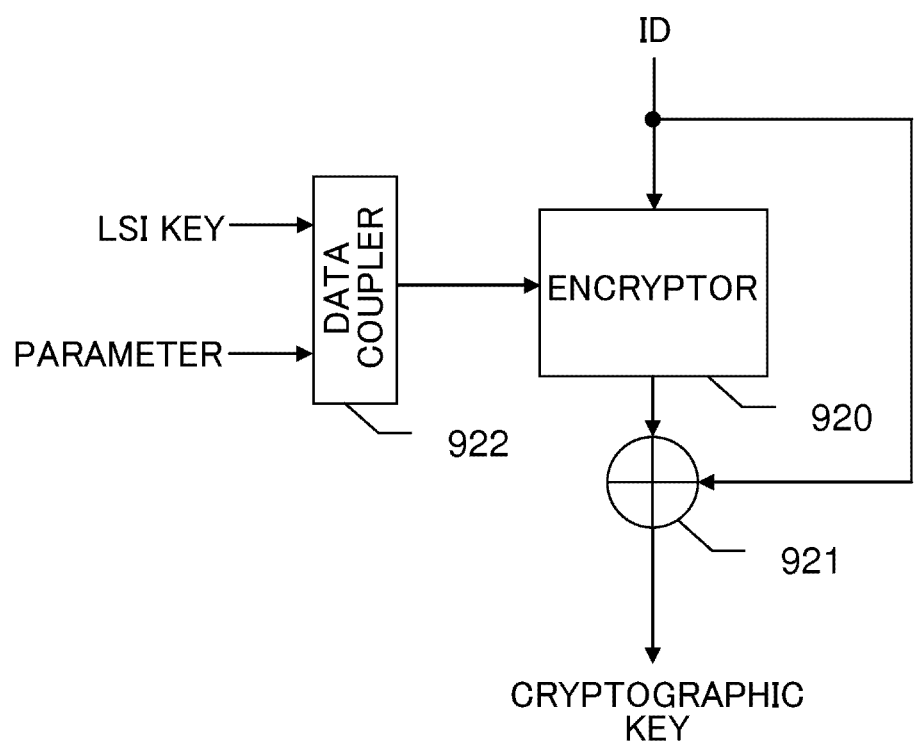
FIG. 18 is a block diagram illustrating a configuration of still another cryptographic key generator.

If the size of the ID or the LSI key is less than the data size or the key size of the cryptographic algorithm used in the encryptor, then it is preferable that a configuration as shown in FIG. 17 or FIG. 18 be used. FIG. 17 illustrates an example configuration when the size of the ID is less than the data size of the cryptographic algorithm used in the encryptor 910. In such a case, a data coupler 912 couples a predetermined parameter to the ID, and inputs data having the same size as the data size of the cryptographic algorithm into the encryptor 910. FIG. 18 illustrates an example configuration when the size of the LSI key is less than the key size of the cryptographic algorithm used in the encryptor 920. In such a case, a data coupler 922 couples a predetermined parameter to the LSI key, and inputs data having the same size as the key size of the cryptographic algorithm into the encryptor 920. In either of the above cases, the set value of the parameter may be determined by the LSI manufacturer by itself, and the set value may be the same for all the LSIs manufactured by that manufacturer, or have a different value for every predetermined number of devices, for each lot, or for each change of a mask set; or all the LSI manufacturers may use a common parameter, which is determined by the key issuing authority.

Figure 15:
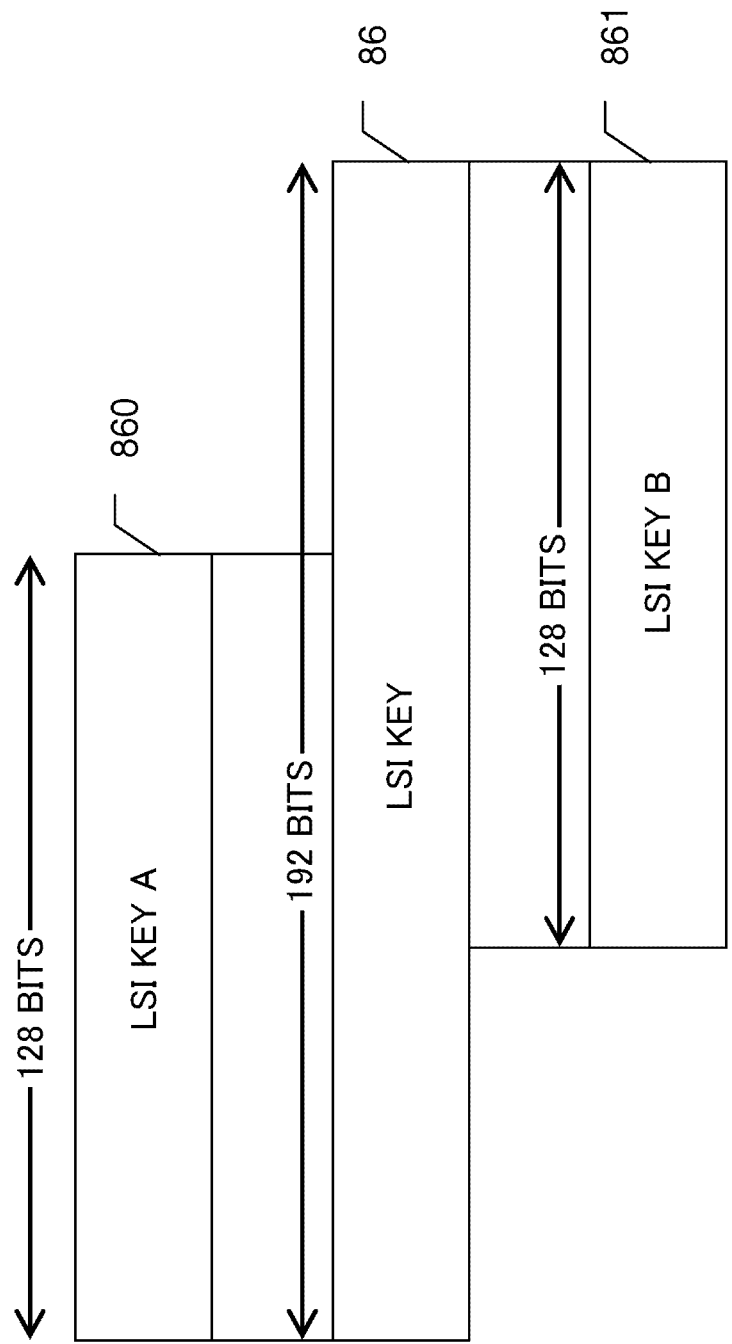
FIG. 15 is a block diagram illustrating structures of the LSI keys A and B.

(3) The two types of LSI keys (LSI keys A and B) which are set in an LSI may share one value. Therefore, the area for the key data set in the LSI can be reduced. However, in this case, if the LSI key A is revealed, then the LSI key B is also revealed. In order to avoid this, and at the same time to reduce the numbers of bits of the set LSI keys A and B, sharing only a part of the bits is possible. For example, as shown in FIG. 15, the LSI may include an LSI key (86) having 192 bits, of which the 128 most significant bits may form the LSI key A (860), and the 128 least significant bits may form the LSI key B (861). In this case, even if the LSI key A is revealed, 32 bits out of the 128 bits of the LSI key B is revealed, but the 96 bits of the rest part is kept confidential. Thus, knowing the entire data of the LSI key B requires a brute force analysis of the 96 bits, which is difficult in practice, and therefore the LSI key B itself is kept confidential.

(4) A plurality of keys may be set in the LSI for each of the LSI keys A and B, and selectively used. In such a case, in order to identify the respective LSI keys, it is preferable that an LSI key A identifier and an LSI key B identifier be introduced, and when a cryptographic key is generated, the LSI key A identifier (or the LSI key B identifier) be input to the first (or the second) cryptographic key generator in addition to the ID1 (or the ID2), and one of the plurality of LSI keys A (or B) is selected based on the identifier, and then a cryptographic key is generated using the ID1 (or ID2). In doing so, a different LSI key can be selectively used for each set manufacturer, and thus the independence of security status (even if a key of a certain set manufacturer is revealed, the confidentiality of the keys of the other set manufacturers is not affected) is more reliably maintained.

Figure 11:
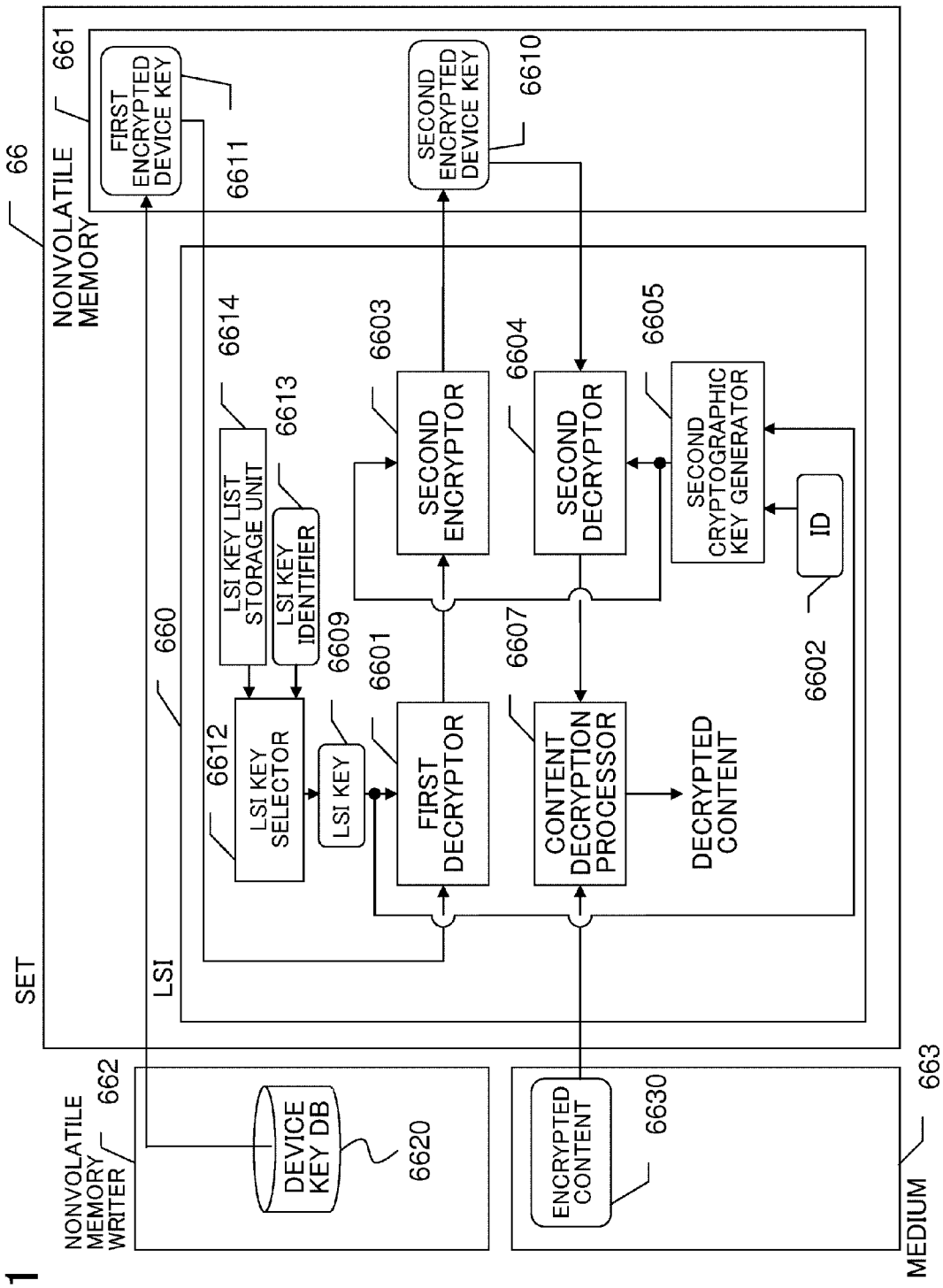
FIG. 11 is a block diagram illustrating a configuration of a key implementation system according to a variation of the sixth embodiment of the present invention.

FIG. 11 illustrates an example configuration when the above scheme is applied to the sixth embodiment. In FIG. 11, an LSI key list storage unit 6614, an LSI key selector 6612, and an LSI key identifier 6613 are added to the configuration of FIG. 9, which illustrates an example configuration of the sixth embodiment. The LSI key list storage unit 6614 stores a predetermined number of LSI keys in the form of a list. Each LSI key is provided with an identifier of a predetermined number of bits. The LSI key selector 6612 obtains the LSI key identified by the LSI key identifier 6613 from the LSI key list storage unit 6614. This is the LSI key 6609. The subsequent processes, such as the decryption processing using the obtained LSI key, are the same as those of the sixth embodiment.

(5) The second encrypted device key may be stored in the set in a location other than the nonvolatile memory external to the LSI. The nonvolatile memory may be provided in the LSI, or the second encrypted device key may be stored in a memory outside the set. Alternatively, the second encrypted device key may be stored in a server in a network, and read by the set by accessing the server through the network when required.

(6) The ID2 does not necessarily need to have a different value for each LSI depending on the security requirements on the device key implementation. For example, even in an operation such that the value of the ID2 is changed for every predetermined number of LSIs, it can be said that a sufficient level of security is provided against clone device production by copying the device key, since finding out a set having the same ID2 after shipment is difficult in practice.

(7) The criterion of how often the value of the ID1 is changed is not limited to those described in the particular embodiments described above. The value may be changed every predetermined number of LSIs, or be changed based on a period of production time. Alternatively, the value may be different for each production number of LSI, for each production lot, or for each set manufacturer which is supplied with LSIs, or may be different based on a combination of criteria described above (for example, different for each set manufacturer, and further for each lot of the set manufacturer, etc.). In addition, the ID1 may be set as ROM data, and may be changed only when a mask set is changed.

(8) The method for generating the values of the ID1 and the ID2 is not limited to a particularly method. The values may be each determined such that an initial value is given first, and then "1" is added sequentially, or may be determined in a random manner using a random number generator. The ID data may be divided into several fields and structured such that the first field contains identification information of the set manufacturer, the second field contains the lot number, etc.

(9) In order to prohibit the set manufacturer from fraudulently requesting the key issuing authority to issue the first encrypted device key, the following measures may be taken.

(9-1) The LSI manufacturer generates a signature generation key and a signature verification key for digital signatures. The signature verification key is sent to the key issuing authority. When sending the ID1 to the set manufacturer, the LSI manufacturer adds to the ID1 the digital signature, generated using the signature generation key, and then sends the ID1. When requesting the key issuing authority to issue the first encrypted device key, the set manufacturer sends the ID1 in which the digital signature has been added. The key encryption tool of the key issuing authority verifies the digital signature of the received ID1 using the signature verification key, and the key issuing authority issues the first encrypted device key only when the validity of the digital signature is confirmed. Thus, the set manufacturer can be prevented from issuing the first encrypted device key for an invalid ID1.

(9-2) The LSI manufacturer sends the ID1 also to the key issuing authority when sending the ID1 to the set manufacturer. The key issuing authority holds the received ID1 in the form of a list, which associates the ID1 with a corresponding LSI manufacturer ID. When receiving a request to issue a first encrypted device key from the set manufacturer, the key encryption tool of the key issuing authority confirms whether or not the pair (LSI manufacturer ID and ID1) exists in the list received from the LSI manufacturer as described above. The key issuing authority issues the first encrypted device key only when the pair exists. Thus, the set manufacturer can be prevented from issuing the first encrypted device key for an invalid ID1. Moreover, the key encryption tool of the key issuing authority may delete the ID1 from the list after completing the issuance processing of the first encrypted device key. This can prevent the LSI manufacturer from needlessly requesting again the issuance regarding an ID1 for which a first encrypted device key has already been issued.

(9-3) The key encryption tool of the key issuing authority may have a list of invalid pairs of LSI manufacturer ID and ID1, and when receiving a request to issue a first encrypted device key from the set manufacturer, the key encryption tool may confirm whether or not the pair (LSI manufacturer ID and ID1) exists in the list received from the LSI manufacturer. If the pair exists in the list, the key encryption tool outputs information indicating that the pair is invalid, and aborts the issuance processing of the first encrypted device key. Thus, even after the LSI manufacturer has issued an ID1 to a fraudulent set manufacturer, aborting the issuance processing of the first encrypted device key to the set manufacturer allows fraudulent set fabrication to be prevented.

Note that the variations 9-1 through 9-3 may be used in any combination.

(10) Although the above embodiments have been described in which a single LSI manufacturer and a single set manufacturer are involved in the process, two or more manufacturers may be involved respectively.

(11) The key issuing authority may authenticate the set manufacturer which requests to issue a first encrypted device key, thereby confirm that the request for issuance is actually sent from that set manufacturer in the following manner. First, the set manufacturer generates a signature generation key and a signature verification key according to a digital-signature based algorithm using public key cryptography. The signature verification key is sent to the key issuing authority. After identifying the set manufacturer, the key issuing authority registers the signature verification key along with the identification information of the set manufacturer to a signature verification key database. When requesting the key issuing authority to issue the first encrypted device key, the set manufacturer generates a digital signature using the signature generation key, adds the digital signature to the request information such as the LSI manufacturer ID, the ID1, and the number of keys to be issued, and sends the result to the key issuing authority. The key issuing authority searches the signature verification key database, obtains the signature verification key for the set manufacturer, and verifies the digital signature in the received request information. The key issuing authority issues the first encrypted device key based on the received request information only when the validity of the digital signature is confirmed. If the validity of the digital signature cannot be confirmed, the key issuing authority rejects the request to issue the first encrypted device key.

(12) Although the above embodiments assume that the ID1 and the ID2 are set in the LSI as fuses, the present invention is not limited thereto. For example, the ID1 and the ID2 may be set as ROM data, or may be written into a nonvolatile memory in the LSI. Alternatively, the ID1 and the ID2 may be written into a memory external to the LSI. In this case, counterfeiting of ID data can be prevented by implementing a mechanism for verifying that the ID data written into the external memory has not been tampered with, in the LSI. In order to prevent the ID data from tampering, for example, the LSI manufacturer generates a message authentication code (MAC) of ID data using a private key in the LSI, and writes the MAC into the external memory along with the ID data. When the LSI reads an ID, the LSI confirms whether or not the ID is not tampered with, using the MAC data.

(13) Although the above embodiments have been described in which the first and the second cryptographic keys are each generated from an LSI key and an ID, any method for generating a cryptographic key may be used as long as the cryptographic key is generated based on confidential information inside the LSI and an ID. For example, as long as the method itself for generating a cryptographic key is kept confidential, a cryptographic key may be generated based on an ID using the generation method described above.

(14) The LSI manufacturer may inform the key issuing authority of the numbers of LSIs shipped to respective set manufacturers. In such a case, the key issuing authority counts the numbers of device keys issued to the respective set manufacturers. If there is a set manufacturer of which the result of comparison between the number of purchased LSIs and the number of issued device keys shows a very large difference, it can be inferred that the set manufacturer may have copied a device key and have set the copied device key into a plurality of sets. Thus, unauthorized copying of a device key by a set manufacturer can be reduced.

Figure 13:
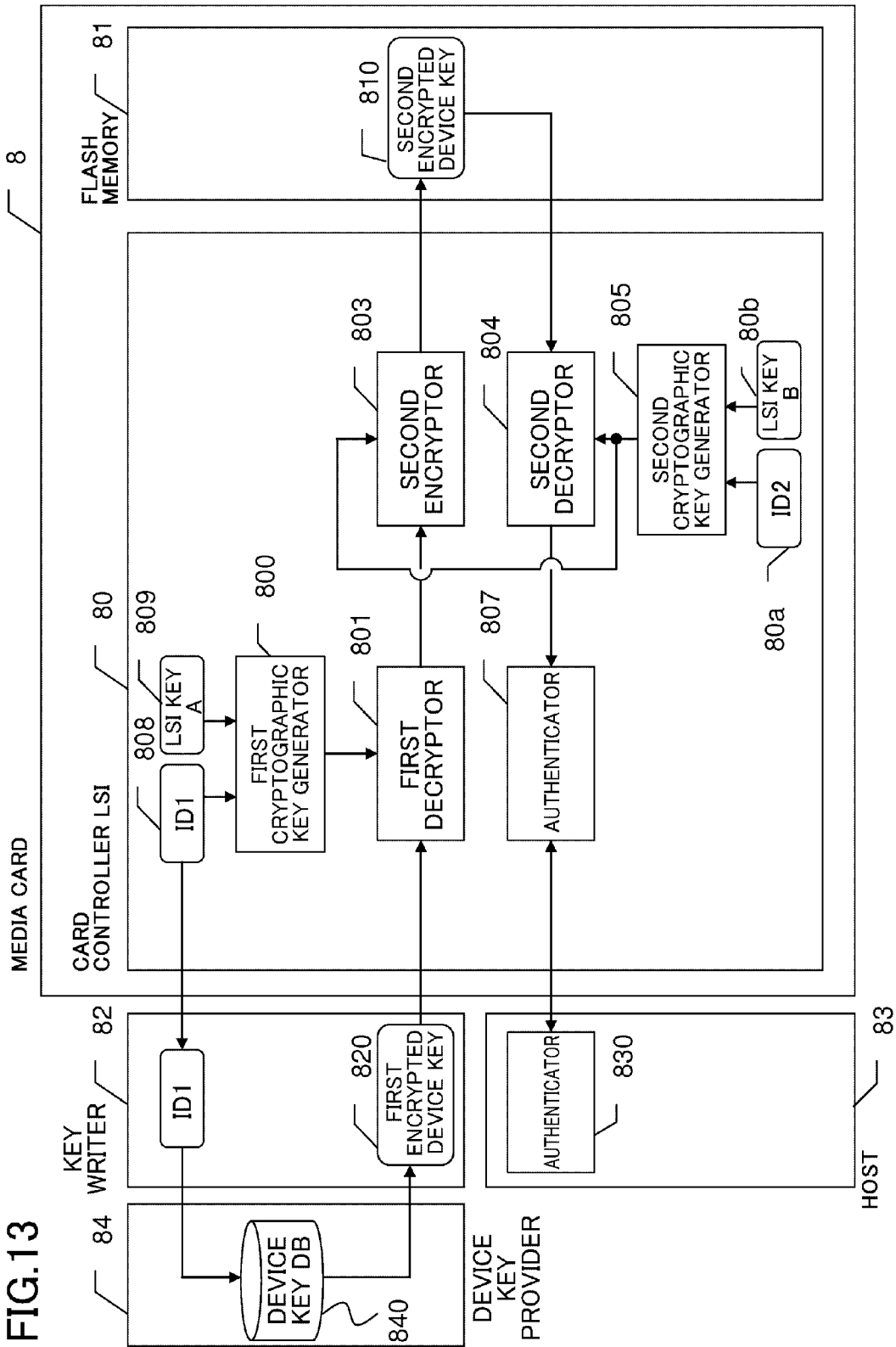
FIG. 13 is a block diagram illustrating a configuration of a key implementation system according to a variation.

(15) The device in which the device keys are set is not limited to those described in the particular embodiments described above. Any device requiring a key to be set for any kind of cryptographic processing or authentication processing is within the scope of the present invention. Examples of such a device include DVD players and recorders, HDD recorders, BD players and recorders, SD-Audio players and recorders, SD-Video players and recorders, SD memory cards, Memory Stick media, and digital TVs. Although the above embodiments have been described in terms of a process for producing a host which reproduces content recorded in a medium, the present invention may apply to any device which stores a key. For example, FIG. 13 illustrates an example in which the first embodiment is applied to a process of manufacturing a media card which performs authentication processing with a host. In FIG. 13, a card controller LSI 80 performs authentication processing with a host 83 using a device key.

Figure 14:
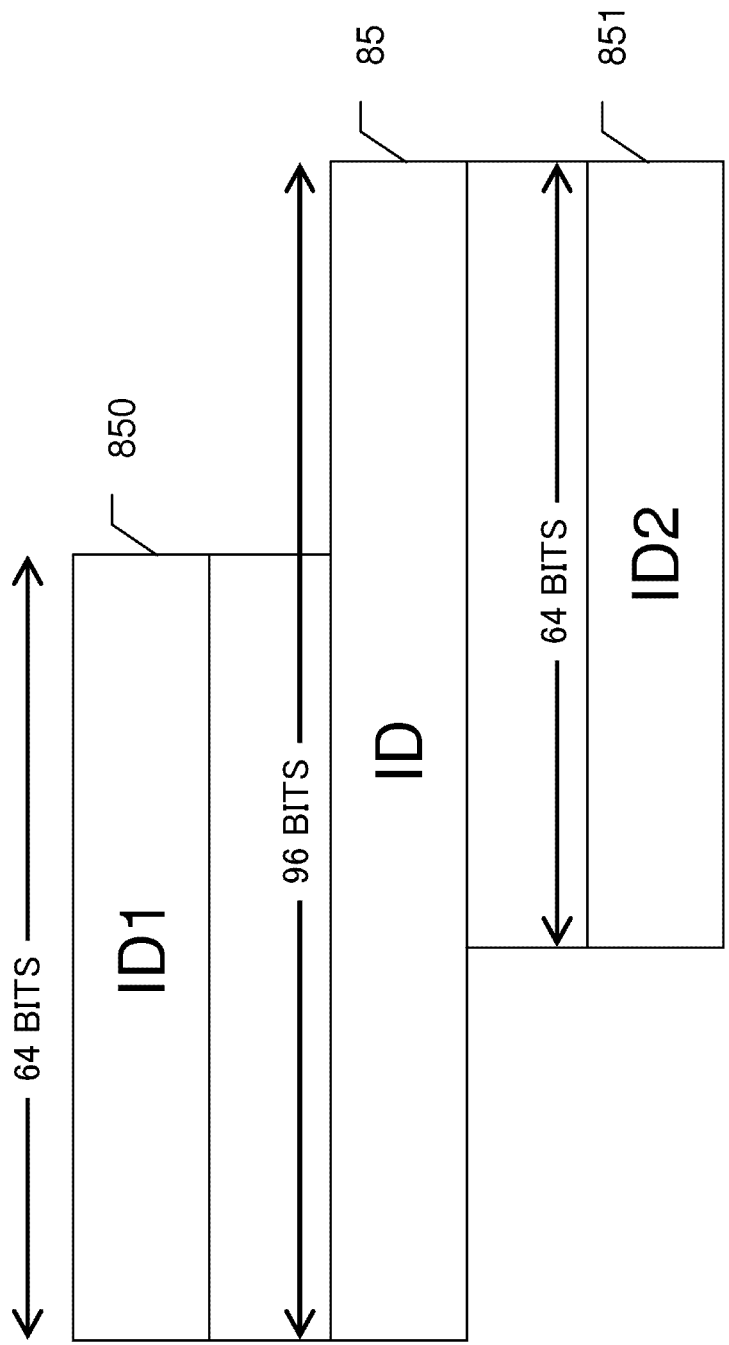
FIG. 14 is a block diagram illustrating structures of the ID1 and the ID2.

(16) In order to reduce the numbers of bits of the set ID1 and the ID2, a part of the bits may be shared. For example, as shown in FIG. 14, the LSI may include an ID (85) having 96 bits, of which the 64 most significant bits may form the ID1 (850), and the 64 least significant bits may form the ID2 (851), both used in the LSI. In this regard, when the value of the ID1 is changed every predetermined number of LSIs, the 32 most significant bits, which are not shared with the ID2, are changed; when the value of the ID2 is changed on a per LSI basis, the 32 least significant bits, which are not shared with the ID1, are changed.

(17) When the LSI key A is sent from the LSI manufacturer to the key issuing authority, the LSI key A may be encrypted using an encrypting tool such as Pretty Good Privacy (PGP), and then stored in a medium and mailed, or sent by an electronic mail. Also when the key issuing authority sends a first encrypted device key to the set manufacturer, the same method as above may be used. The process may be such that the key issuing authority operates a Web server to accept a request for issuing various keys online, and the LSI or set manufacturer accesses to the Web server, and then performs registration of the LSI key A, sends a request for issuing a first encrypted device key, or downloads the issued data. In such a case, a protocol such as Secure Socket Layer (SSL) may be used as a means for communication in authentication and encryption with the Web server.

(18) The LSI keys A and B may be managed in any of the following manners. (A) A different value may be set for each LSI manufacturer, and a same value may be set to all the LSIs manufactured by that manufacturer. (B) A different value may be set for each LSI manufacturer, and further the LSIs manufactured by that manufacturer may have a different value for every predetermined number of devices, for every predetermined number of lots, for each change of a mask set, or for each set manufacturer which supplies the LSIs. (C) A same value may be set for all the LSIs of all the LSI manufacturers.

(19) The above embodiments and the above variations may be used in any combination.

What is claimed is:

1. A key implementation system, comprising:
a large-scale integrated circuit (LSI); and
a storage unit, wherein:
the LSI includes:
    a first decryptor configured to receive first encrypted key data, and to decrypt the first encrypted key data using a first cryptographic key, thereby generating first decrypted key data;
    a second cryptographic key generator configured to generate a second cryptographic key based on a second ID;
    a second encryptor configured to encrypt the first decrypted key data using the second cryptographic key, thereby generating second encrypted key data, and to store the second encrypted key data in the storage unit; and
    a second decryptor configured to read the second encrypted key data that has been stored by the second encryptor from the storage unit, and decrypt the second encrypted key data using the second cryptographic key, thereby generating second decrypted key data, and
at a time of key setting, the second encryptor stores the second encrypted key data in the storage unit, and at a time of key usage, the second decryptor reads the second encrypted key data from the storage unit.

2. The key implementation system of claim 1, wherein the LSI includes a first cryptographic key generator configured to generate the first cryptographic key based on a first ID.

3. The key implementation system of claim 2, wherein the first cryptographic key generator generates the first cryptographic key based on a first LSI key and the first ID, and the second cryptographic key generator generates the second cryptographic key based on a second LSI key and the second ID.

4. The key implementation system of claim 2, wherein the first ID has a different value for every predetermined number of the LSIs, and
the second ID has a different value for each LSI.

5. The key implementation system of claim 2, wherein the LSI holds ID data including first partial data, second partial data, and third partial data,
the first ID includes the first and the third partial data, and
the second ID includes the second and the third partial data.

6. The key implementation system of claim 2, wherein the first ID is held in the storage unit, and
the second ID is held in the LSI.

7. The key implementation system of claim 1, wherein the first decrypted key data includes verification data, and
the LSI includes a first verifier configured to confirm the verification data, and to verify a validity of the first decrypted key data.

8. The key implementation system of claim 1, wherein the second decrypted key data includes verification data, and
the LSI includes a second verifier configured to confirm the verification data, and to verify a validity of the second decrypted key data.

9. The key implementation system of claim 1, comprising:
a content decryption processor configured to perform, using the second decrypted key data, authentication processing in relation to access to encrypted content, or decryption processing of encrypted content.

10. A large-scale integrated circuit (LSI), comprising:
a second cryptographic key generator configured to generate a second cryptographic key based on a second ID;
a first decryptor configured to receive first encrypted key data, and to decrypt the first encrypted key data using a first cryptographic key, thereby generating first decrypted key data;
a second encryptor configured to encrypt the first decrypted key data using the second cryptographic key, thereby generating second encrypted key data, and to store the second encrypted key data in an external storage unit; and
a second decryptor configured to read the second encrypted key data that has been stored by the second encryptor from the external storage unit, and decrypt the second encrypted key data using the second cryptographic key, thereby generating second decrypted key data,
wherein at a time of key setting, the second encryptor stores the second encrypted key data in the external storage unit, and at a time of key usage, the second decryptor reads the second encrypted key data from the external storage unit.

11. The LSI of claim 10, further comprising:
a first cryptographic key generator configured to generate the first cryptographic key based on a first ID.

12. The LSI of claim 11, wherein:
the first cryptographic key generator generates the first cryptographic key based on a first LSI key and the first ID, and
the second cryptographic key generator generates the second cryptographic key based on a second LSI key and the second ID.

13. The LSI of claim 11, wherein:
the LSI holds ID data including first partial data, second partial data, and third partial data,
the first ID includes the first and the third partial data, and
the second ID includes the second and the third partial data.

14. The LSI of claim 11, wherein
the first ID is held in the storage unit, and
the second ID is held in the LSI.

15. The LSI of claim 10, wherein:
the first decrypted key data includes verification data, and
the LSI includes a first verifier configured to confirm the verification data, and to verify a validity of the first decrypted key data.

16. The LSI of claim 10, wherein:
the second decrypted key data includes verification data, and
the LSI includes a second verifier configured to confirm the verification data, and to verify a validity of the second decrypted key data.

17. The LSI of claim 10, further comprising:
a content decryption processor configured to perform, using the second decrypted key data, authentication processing in relation to access to encrypted content, or decryption processing of encrypted content.

18. A key implementation system, comprising:
a large-scale integrated circuit (LSI); and
a storage unit, wherein:
the LSI includes:
 a first decryptor configured to receive first encrypted key data, and to decrypt the first encrypted key data using an LSI key, thereby generating first decrypted key data;
 a second cryptographic key generator configured to generate a second cryptographic key based on an ID;
 a second encryptor configured to encrypt the first decrypted key data using the second cryptographic key, thereby generating second encrypted key data, and to store the second encrypted key data in the storage unit; and
 a second decryptor configured to read the second encrypted key data that has been stored by the second encryptor from the storage unit, and decrypt the second encrypted key data using the second cryptographic key, thereby generating second decrypted key data, and
at a time of key setting, the second encryptor stores the second encrypted key data in the storage unit, and at a time of key usage, the second decryptor reads the second encrypted key data from the storage unit.

19. The key implementation system of claim 18, wherein the LSI key and the ID is held in the LSI.

20. The key implementation system of claim 18, further comprising:
a content decryption processor configured to perform, using the second decrypted key data, authentication processing in relation to access to encrypted content, or decryption processing of encrypted content.

21. A large-scale integrated circuit (LSI), comprising:
a second cryptographic key generator configured to generate a second cryptographic key based on an ID;
a first decryptor configured to receive first encrypted key data, and to decrypt the first encrypted key data using an LSI key, thereby generating first decrypted key data;
a second encryptor configured to encrypt the first decrypted key data using the second cryptographic key, thereby generating second encrypted key data, and to store the second encrypted key data in an external storage unit; and
a second decryptor configured to read the second encrypted key data that has been stored by the second encryptor from the external storage unit, and decrypt the second encrypted key data using the second cryptographic key, thereby generating second decrypted key data,
wherein at a time of key setting, the second encryptor stores the second encrypted key data in the external storage unit, and at a time of key usage, the second decryptor reads the second encrypted key data from the external storage unit.

22. The LSI of claim 21, wherein
the LSI key and the ID is held in the LSI.

23. The LSI of claim 21, further comprising:
a content decryption processor configured to perform, using the second decrypted key data, authentication processing in relation to access to encrypted content, or decryption processing of encrypted content.

* * * * *